United States Patent
Luo et al.

(10) Patent No.: US 12,444,390 B2
(45) Date of Patent: Oct. 14, 2025

(54) DISPLAY CONTROL METHOD, APPARATUS, AND STORAGE MEDIUM

(71) Applicant: HUAWEI TECHNOLOGIES CO., LTD., Guangdong (CN)

(72) Inventors: Yi Luo, Shenzhen (CN); Xuan Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 331 days.

(21) Appl. No.: 18/018,683

(22) PCT Filed: Jul. 28, 2021

(86) PCT No.: PCT/CN2021/108966
§ 371 (c)(1),
(2) Date: Jan. 30, 2023

(87) PCT Pub. No.: WO2022/022575
PCT Pub. Date: Feb. 3, 2022

(65) Prior Publication Data
US 2023/0306929 A1 Sep. 28, 2023

(30) Foreign Application Priority Data
Jul. 31, 2020 (CN) .......................... 202010755870.5

(51) Int. Cl.
*G09G 5/373* (2006.01)
*G06F 3/147* (2006.01)
(52) U.S. Cl.
CPC ............. *G09G 5/373* (2013.01); *G06F 3/147* (2013.01); *G09G 2340/0442* (2013.01)

(58) Field of Classification Search
CPC . G09G 5/373; G09G 2340/0442; G06F 3/147
See application file for complete search history.

(56) References Cited

U.S. PATENT DOCUMENTS

| | | | | |
|---|---|---|---|---|
| 2014/0089796 | A1* | 3/2014 | Hyun | G11B 27/031 715/716 |
| 2015/0120817 | A1* | 4/2015 | Jeong | G06F 3/1423 709/203 |
| 2016/0110152 | A1* | 4/2016 | Choi | G06F 3/04817 345/2.3 |
| 2020/0195877 | A1 | 6/2020 | Li | |

FOREIGN PATENT DOCUMENTS

| | | |
|---|---|---|
| CN | 108228290 A | 6/2018 |
| CN | 109192113 A | 1/2019 |
| CN | 109600659 A | 4/2019 |
| CN | 109710161 A | 5/2019 |

* cited by examiner

*Primary Examiner* — Michelle Chin

(57) ABSTRACT

This application provides a display control method and apparatus, and the method includes: separately obtaining first size information of a display screen of an electronic device, second size information of to-be-played multimedia information, and an operation view used to control the multimedia information; determining, based on the first size information and the second size information, a first area that is on the display screen and in which the multimedia information is displayed; and displaying the operation view in a second area other than the first area on the display screen. In the display control method and apparatus provided in this application, a display effect of a picture can be effectively improved.

18 Claims, 22 Drawing Sheets

---

Separately obtain first size information of a display screen of an electronic device, second size information of to-be-played multimedia information, and an operation view used to control the multimedia information — 701

Determine, based on the first size information and the second size information, a first area that is on the display screen and in which the multimedia information is displayed — 702

Display the operation view in a second area other than the first area on the display screen — 703

DISPLAY CONTROL METHOD, APPARATUS, AND STORAGE MEDIUM

CROSS-REFERENCE TO RELATED APPLICATIONS

This application is a National Stage of International Application No. PCT/CN2021/108966, filed on Jul. 28, 2021, which claims priority to Chinese Patent 202010755870.5, filed on Jul. 31, 2020. Both of the aforementioned applications are hereby incorporated by reference in their entireties.

TECHNICAL FIELD

Embodiments of this application relate to the field of terminal technologies, and in particular, to a display control method and apparatus, and a storage medium.

BACKGROUND

In recent years, with the rapid development of a screen touch technology, electronic devices (such as a mobile phone, a tablet computer, and a computer) that use a touchscreen are widely used. In addition, to improve user experience, a screen of the touchscreen of the electronic device is increasingly large, so that a user can browse more information on the larger screen.

FIG. 1a is a schematic diagram of a display manner of a video in a conventional technology FIG. 1B is a schematic diagram of another display manner of a video in a conventional technology. As shown in FIG. 1a and FIG. 1b, a multimedia information picture is usually in only a fixed few types of ratios in a current application interface. When multimedia information is played on an electronic device whose screen size does not match the multimedia information, black areas 102 filled with black may appear on left and right sides of a screen 101 (as shown in FIG. 1a) or upper and lower sides (as shown in FIG. 1B), and the black area may also be referred to as a black edge. In addition, when a user needs to perform a corresponding operation on the multimedia information in a process of viewing the multimedia information, the user may invoke an operation view 103 by tapping the screen. For example, if the multimedia information is a video, the user may invoke one or more of operation views "bullet screen", "speed multiplier", "top-speed", and "episode selection", a progress bar view, a play and pause control view, and the like.

However, a display manner of the multimedia information in the conventional technology has a poor display effect.

SUMMARY

Embodiments of this application provide a display control method and apparatus, and a storage medium, so that a display effect of a picture can be effectively improved.

According to a first aspect, an embodiment of this application provides a display control method, including: separately obtaining first size information of a display screen of an electronic device, second size information of to-be-played multimedia information, and an operation view used to control the multimedia information; determining, based on the first size information and the second size information, a first area that is on the display screen and in which the multimedia information is displayed; and displaying the operation view in a second area other than the first area on the display screen.

In this solution, the multimedia information is displayed in the first area, and the operation view is displayed in the second area other than the first area; in other words, the multimedia information and the operation view are separated for display. Therefore, utilization of the second area can be improved. In addition, because all areas on the screen are used, utilization of the screen can be improved. Further, because the multimedia information and the operation view are separated for display, a phenomenon in a conventional technology that the operation view is superposed on the multimedia information for display is avoided, and therefore, a display effect of a picture can be effectively improved.

In a possible implementation, the displaying the operation view in a second area other than the first area on the screen includes: determining a display manner of the operation view based on the first size information and the second size information, where the display manner includes fixed and unfolded display or folded and shrunk display; and displaying the operation view in the second area in the display manner.

In this solution, the operation view may be displayed in a fixed and unfolded manner or displayed in a folded and shrunk manner based on sizes of the first size information and the second size information, so that not only integrity of the picture can be ensured, but utilization of the second area can also be improved.

In a possible implementation, the determining a display manner of the operation view based on the first size information and the second size information includes: determining a difference between the first size information and the second size information; and if the difference is greater than a first preset value, determining that the display manner of the operation view is fixed and unfolded display.

In this solution, when the difference between the first size information and the second size information is greater than the first preset value, the operation view may be controlled to be displayed in the second area in a fixed and unfolded manner. In this way, not only utilization of the second area can be improved, but a phenomenon that the operation view needs to be first tapped and invoked before an operation can be performed is avoided, so that operations of a user are simplified, and user experience is improved.

In a possible implementation, the method further includes: if the difference is less than a second preset value, determining that the display manner of the operation view is folded and shrunk display.

In this solution, when the difference between the first size information and the second size information is less than the second preset value, the operation view may be controlled to be displayed in the second area in a folded and shrunk manner. In this way, not only utilization of the second area can be improved, but integrity of a multimedia information picture can also be ensured.

In a possible implementation, the display manner is folded and shrunk display; and the displaying the operation view in the second area in the display manner includes: if a second operation instruction triggered by a user is not received within a preset time period, displaying some operation views in the second area, and hiding other operation views.

In this solution, if the second operation instruction triggered by the user is not received within the preset time period, only some operation views are displayed in the second area, so that a display effect of the picture can be improved.

In a possible implementation, the method further includes: displaying all operation views in the second area after a first operation instruction triggered by the user is received.

In this solution, all the operation views may be displayed in the second area after the first operation instruction triggered by the user is received, so that an operation of the user can be facilitated, and user experience is improved.

In a possible implementation, the other operation views include a view whose quantity of use times is less than a third preset value.

In this solution, the view whose quantity of use times is less than the third preset value may be hidden, so that convenience of a user operation can be improved, and user experience is improved.

In a possible implementation, the obtaining second size information of to-be-played multimedia information includes: receiving a third operation instruction triggered by the user, where the third operation instruction includes identification information of an application; determining, based on the identification information of the application, a video view that is in the application and that is used to render the multimedia information; and determining the second size information based on the video view.

In this solution, the second size information of the multimedia information is determined by using the video view that is in the application and that is used to render the multimedia information, so that accuracy of the second size information can be improved.

In a possible implementation, the displaying the operation view in a second area other than the first area on the screen includes: determining an application used to play the multimedia information; separately determining whether views of the application include a surface view and an interactive view; if the views of the application include the surface view and the interactive view, determining a first common parent layout node of the surface view and the interactive view; and displaying the operation view in the second area based on the first common parent layout node.

In this solution, after the views are traversed, when it is determined that the views include the surface view and the interactive view, the operation view is displayed in the second area, so that convenience of a user operation can be improved.

In a possible implementation, the displaying the operation view in the second area based on the first common parent layout node includes: determining whether the first common parent layout node is FrameLayout; if the first common parent layout node is FrameLayout, setting the first common parent layout node of the surface view and the interactive view to a LinearLayout view; and displaying the operation view in the second area based on the LinearLayout view.

In this solution, a LinearLayout (Horizontal) view or a LinearLayout (Vertical) view is added to a view tree, so that the operation view can be controlled to be in a horizontal streaming layout or a vertical linear layout, to separate a display area of the multimedia information from a display area of the operation view. In this way, a display effect of the multimedia information can be improved.

According to a second aspect, an embodiment of this application provides a display control apparatus, including: a processing unit, configured to separately obtain first size information of a display screen of an electronic device, second size information of to-be-played multimedia information, and an operation view used to control the multimedia information, where the processing unit is further configured to determine, based on the first size information and the second size information, a first area that is on the display screen and in which the multimedia information is displayed; and a display unit, configured to display the operation view in a second area other than the first area on the display screen.

In a possible implementation, the display unit is specifically configured to: determine a display manner of the operation view based on the first size information and the second size information, where the display manner includes fixed and unfolded display or folded and shrunk display; and display the operation view in the second area in the display manner.

In a possible implementation, the processing unit is specifically configured to: determine a difference between the first size information and the second size information; and if the difference is greater than a first preset value, determine that the display manner of the operation view is fixed and unfolded display.

In a possible implementation, the processing unit is further configured to: if the difference is less than a second preset value, determine that the display manner of the operation view is folded and shrunk display.

In a possible implementation, the display manner is folded and shrunk display; and the display unit is specifically configured to: if a second operation instruction triggered by a user is not received within a preset time period, display some operation views in the second area, and hide other operation views.

In a possible implementation, the apparatus further includes a receiving unit, and the receiving unit is configured to receive a first operation instruction triggered by the user; and the display unit is further configured to display all operation views in the second area after the receiving unit receives the first operation instruction triggered by the user.

In a possible implementation, the other operation views include a view whose quantity of use times is less than a third preset value.

In a possible implementation, the receiving unit is further configured to receive a third operation instruction triggered by the user, and the third operation instruction includes identification information of an application. The processing unit is further configured to: determine, based on the identification information of the application, a video view that is in the application and that is used to render the multimedia information, and determine the second size information based on the video view.

In a possible implementation, the processing unit is specifically configured to: determine an application used to play the multimedia information; separately determine whether views of the application include a surface view and an interactive view; if the views of the application include the surface view and the interactive view, determine a first common parent layout node of the surface view and the interactive view; and display the operation view in the second area based on the first common parent layout node.

In a possible implementation, the processing unit is specifically configured to: determine whether the first common parent layout node is FrameLayout; if the first common parent layout node is FrameLayout, set the first common parent layout node of the surface view and the interactive view to a LinearLayout view; and display the operation view in the second area based on the LinearLayout view.

It may be understood that the display control apparatus shown in the second aspect may be the display control apparatus, or may be a component (such as a chip, a circuit, a module, or a unit) that may be configured in the display control apparatus.

According to a third aspect, an embodiment of this application provides an electronic device. The electronic device includes a processor, a memory, and a display, a display screen of the display includes a first area and a second area that do not overlap, the display is configured to display content according to an instruction of the processor, the memory stores a computer program, and the processor executes the computer program stored in the memory, so that the electronic device performs the following operations: separately obtaining first size information of the display screen of the electronic device, second size information of to-be-played multimedia information, and an operation view used to control the multimedia information; determining, based on the first size information and the second size information, the first area that is on the display screen and in which the multimedia information is displayed; and displaying the operation view in the second area other than the first area on the display screen.

In a possible implementation, the processor is specifically configured to: determine a display manner of the operation view based on the first size information and the second size information, where the display manner includes fixed and unfolded display or folded and shrunk display; and display the operation view in the second area in the display manner.

In a possible implementation, the processor is specifically configured to: determine a difference between the first size information and the second size information; and if the difference is greater than a first preset value, determine that the display manner of the operation view is fixed and unfolded display.

In a possible implementation, the processor is further configured to: if the difference is less than a second preset value, determine that the display manner of the operation view is folded and shrunk display.

In a possible implementation, the display manner is folded and shrunk display; and the processor is specifically configured to: if a second operation instruction triggered by a user is not received within a preset time period, display some operation views in the second area, and hide other operation views.

In a possible implementation, the processor is further configured to display all operation views in the second area after a first operation instruction triggered by the user is received.

In a possible implementation, the other operation views include a view whose quantity of use times is less than a third preset value.

In a possible implementation, the processor is specifically configured to: receive a third operation instruction triggered by the user, where the third operation instruction includes identification information of an application; determine, based on the identification information of the application, a video view that is in the application and that is used to render the multimedia information; and determine the second size information based on the video view.

In a possible implementation, the processor is specifically configured to: determine an application used to play the multimedia information; separately determine whether views of the application include a surface view and an interactive view; if the views of the application include the surface view and the interactive view, determine a first common parent layout node of the surface view and the interactive view; and display the operation view in the second area based on the first common parent layout node.

In a possible implementation, the processor is specifically configured to: determine whether the first common parent layout node is FrameLayout; if the first common parent layout node is FrameLayout, set the first common parent layout node of the surface view and the interactive view to a LinearLayout view; and display the operation view in the second area based on the LinearLayout view.

According to a fourth aspect, an embodiment of this application provides an electronic device. The electronic device includes a processor, a memory, and a foldable display screen. When the display screen is in a folded state, size information of a lighted part of the display screen is third size information, multimedia information is displayed on the display screen, and an operation view for controlling the multimedia information is superposed on the multimedia information. When the display screen is in an unfolded state, the size information of the display screen is first size information. The memory stores a computer program, and the processor executes the computer program stored in the memory, so that the electronic device performs the following operation: determining, based on the first size information and second size information of the multimedia information, a first area that is on the display screen in the unfolded state and in which the multimedia information is displayed, and traversing the operation view to display the operation view in a second area other than the first area on the display screen in the unfolded state.

In a possible implementation, the processor is specifically configured to: determine a display manner of the operation view based on the first size information and the second size information, where the display manner includes fixed and unfolded display or folded and shrunk display; and display the operation view in the second area in the display manner.

In a possible implementation, the processor is specifically configured to: determine a difference between the first size information and the second size information; and if the difference is greater than a first preset value, determine that the display manner of the operation view is fixed and unfolded display.

In a possible implementation, the processor is further configured to: if the difference is less than a second preset value, determine that the display manner of the operation view is folded and shrunk display.

In a possible implementation, the display manner is folded and shrunk display; and the processor is specifically configured to: if a second operation instruction triggered by a user is not received within a preset time period, display some operation views in the second area, and hide other operation views.

In a possible implementation, the processor is further configured to display all operation views in the second area after a first operation instruction triggered by the user is received.

In a possible implementation, the other operation views include a view whose quantity of use times is less than a third preset value.

In a possible implementation, the processor is specifically configured to: receive a third operation instruction triggered by the user, where the third operation instruction includes identification information of an application; determine, based on the identification information of the application, a video view that is in the application and that is used to render the multimedia information; and determine the second size information based on the video view.

In a possible implementation, the processor is specifically configured to: determine an application used to play the multimedia information; separately determine whether views of the application include a surface view and an interactive view; if the views of the application include the surface view and the interactive view, determine a first common parent layout node of the surface view and the interactive view; and display the operation view in the second area based on the first common parent layout node.

In a possible implementation, the processor is specifically configured to: determine whether the first common parent layout node is FrameLayout; if the first common parent layout node is FrameLayout, set the first common parent layout node of the surface view and the interactive view to a LinearLayout view; and display the operation view in the second area based on the LinearLayout view.

According to a fifth aspect, an embodiment of this application provides a chip. The chip includes a programmable logic circuit and an input interface, the input interface is configured to obtain to-be-processed data, and the logic circuit is configured to perform the display control method in any one of the foregoing possible implementations of the first aspect.

According to a sixth aspect, an embodiment of this application provides a computer-readable storage medium. The computer-readable storage medium stores instructions, and when the instructions are run on an electronic device, the electronic device is enabled to perform the display control method in any one of the foregoing possible implementations of the first aspect.

According to a seventh aspect, an embodiment of this application provides a computer program product. When the computer program product is run on an electronic device, the electronic device is enabled to perform the display control method in any one of the foregoing possible implementations of the first aspect.

According to the display control method and apparatus and the storage medium provided in embodiments of this application, the multimedia information is displayed in the first area of the display screen based on the first size information of the display screen of the electronic device and the second size information of the to-be-played multimedia information, and the operation view is displayed in the second area other than the first area; in other words, the multimedia information and the operation view are separated for display. Therefore, utilization of the second area can be improved. In addition, because all areas on the screen are used, utilization of the screen can be improved. Further, because the multimedia information and the operation view are separated for display, a phenomenon in a conventional technology that the operation view is superposed on the multimedia information for display is avoided, and therefore, a display effect of a picture can be effectively improved.

DESCRIPTION OF EMBODIMENTS

In the specification, claims, and accompanying drawings of this application, the terms "first", "second", "third", and the like are intended to distinguish between different objects but do not indicate a particular order.

In embodiments of this application, the word "example", "for example", or the like is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

The following describes implementations of embodiments of this application in detail with reference to accompanying drawings.

Figure 1A:
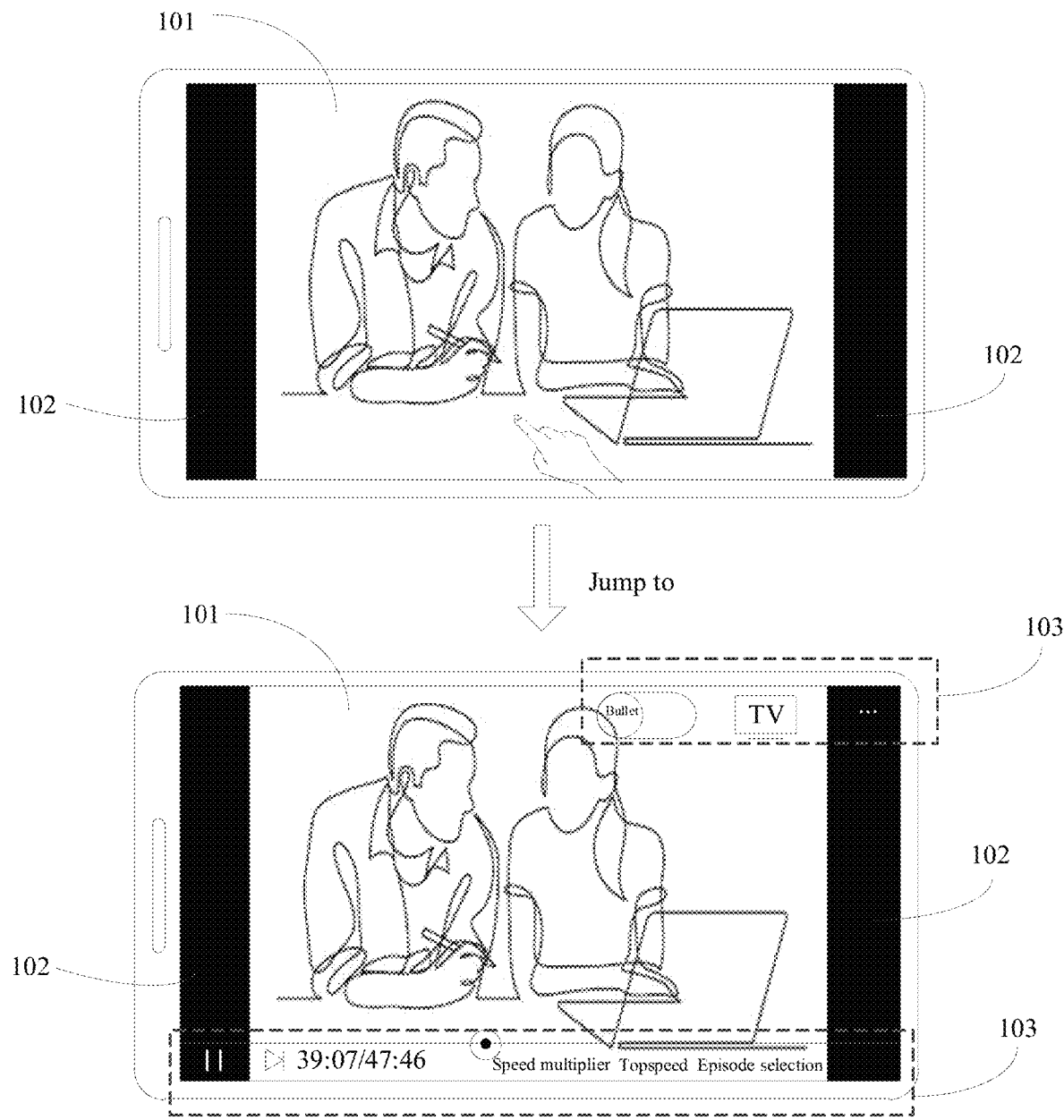
FIG. 1a is a schematic diagram of a display manner of a video in a conventional technology.
Figure 1B:
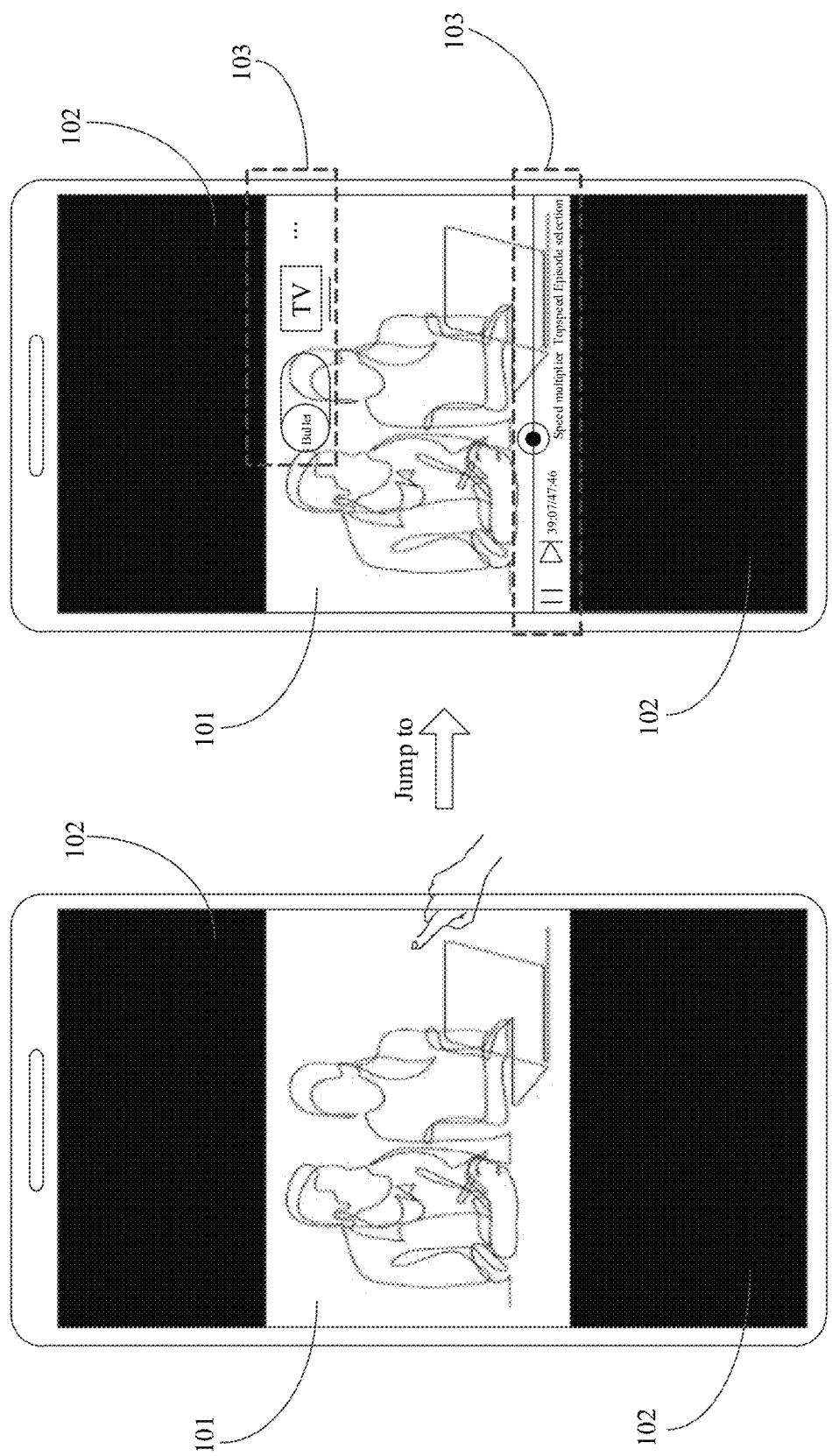
FIG. 1B is a schematic diagram of another display manner of a video in a conventional technology.
Figure 2:
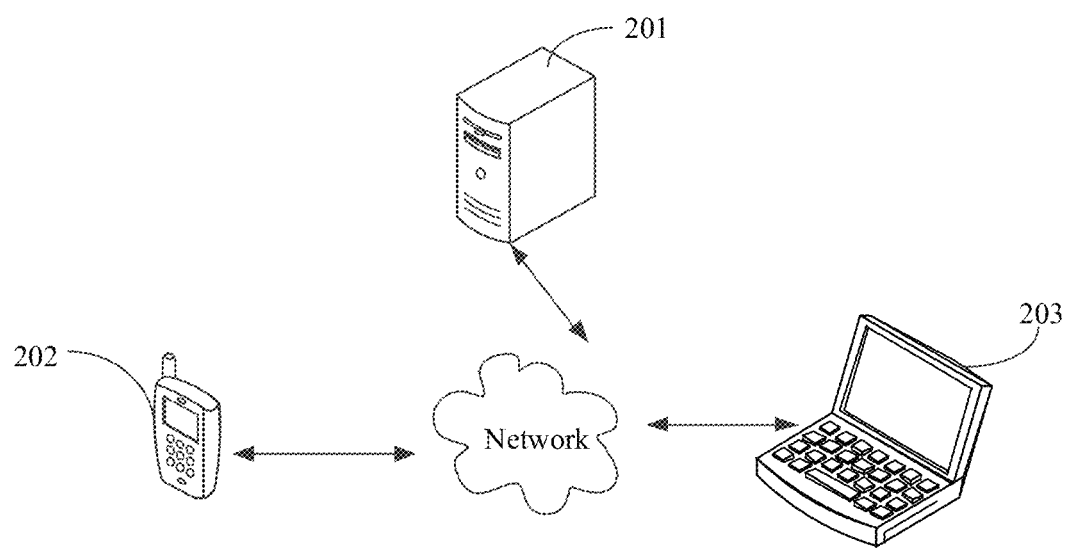
FIG. 2 is an example diagram of an architecture of a communication system to which an embodiment of this application is applicable.

FIG. 2 is an example diagram of an architecture of a communication system to which an embodiment of this application is applicable. As shown in FIG. 2, the communication system includes a server 201 and at least one electronic device (an electronic device 202 and an electronic device 203 shown in FIG. 2). The electronic device may be connected to the server 201 in a wireless manner or a wired manner. In addition, FIG. 1 is only a schematic diagram. The communication system may further include another device, for example, may further include a network device, a wireless relay device, a wireless backhaul device, and a core network device that are not shown in FIG. 2. The electronic device may be connected to the network device in a wireless manner or a wired manner. The network device may be connected to the server and/or the core network device in a wireless manner or a wired manner. The core network device and the network device may be separate and different physical devices; a function of the core network device and a logical function of the network device may be integrated into a same physical device; or some functions of the core network device and some functions of the network device may be integrated into one physical device. The electronic device may be at a fixed position, or may be movable. This is not limited in this application. A quantity of core network devices, a quantity of network devices, and a quantity of electronic devices included in the communication system are not limited in embodiments of this application.

In addition, the communication system may alternatively include only the electronic device 202 or the electronic device 203; in other words, the communication system may not include the server 201. In this case, the electronic device 202 or the electronic device 203 may play a locally stored video or picture.

In some embodiments, the electronic device may be a wireless terminal device capable of receiving scheduling and indication information of the network device, and the wireless terminal device may be a device that provides voice and/or data connectivity for a user, a handheld device with a wireless connection function, or another processing device connected to a wireless modem. The wireless terminal device may communicate with one or more core networks or the Internet by using a radio access network (for example, radio access network, RAN). The wireless terminal device may be a mobile terminal device, such as a mobile phone (or referred to as a "cellular" phone or a mobile phone (mobile phone)), a computer, or a data card. For example, the wireless terminal device may be a portable, pocket-sized, handheld, computer-built-in, or vehicle-mounted mobile apparatus that exchanges language and/or data with the radio access network. For example, the mobile terminal device may be a device such as a personal communication service (personal communication service, PCS) phone, a cordless telephone set, a session initiation protocol (SIP) phone, a wireless local loop (wireless local loop, WLL) station, a personal digital assistant (personal digital assistant, PDA), a tablet computer (Pad), or a computer with a wireless transceiver function. The wireless terminal device may also be referred to as a system, a subscriber unit (subscriber unit), a subscriber station (subscriber station), a mobile station (mobile station), a mobile station (mobile station, MS), a remote station (remote station), an access point (access point, AP), a remote terminal (remote terminal) device, an access terminal (access terminal) device, a user terminal device (user terminal), a user agent (user agent), a subscriber station (subscriber station, SS), a customer premises equipment (customer premises equipment, CPE), a terminal (terminal), user equipment (user equipment, UE), a mobile terminal (mobile terminal, MT), or the like. In a URLLC application scenario, the terminal device may be a wireless terminal in industrial control (industrial control), a wireless terminal in self driving (self driving), a wireless terminal in a remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like.

In addition, the electronic device may be any other physical device with a display screen, such as a control screen in a vehicle machine or a computer display. In addition, for a non-physical device such as a split-screen window or a free window (Freeform) on a display screen, when a horizontal-to-vertical ratio of the window does not match a video picture, the technical solution in embodiments of this application may also be used.

Figure 3:
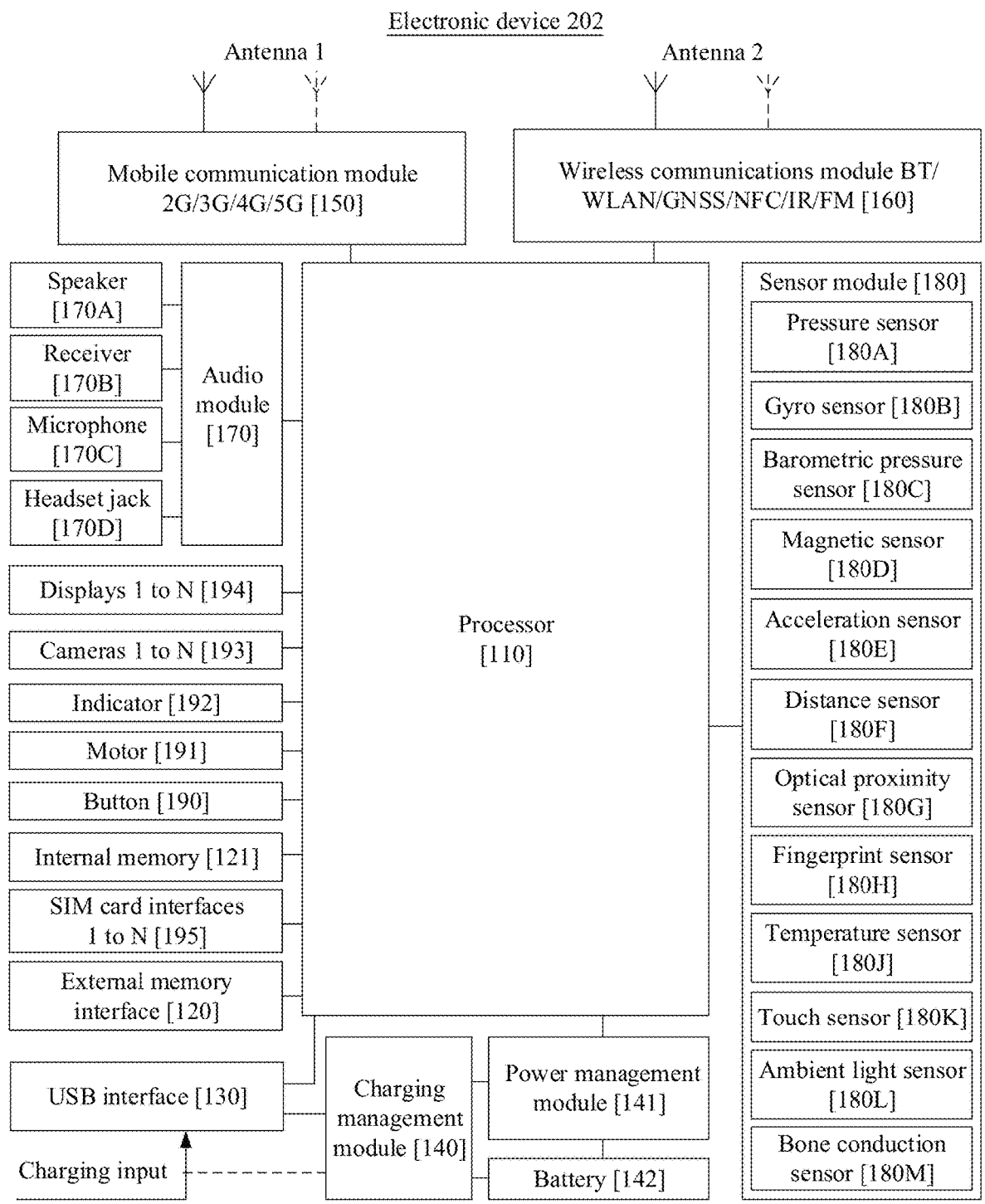
FIG. 3 is a schematic diagram of a structure of an electronic device according to an embodiment of this application.

In this embodiment, a structure of the electronic device 202 may be shown in FIG. 3. FIG. 3 is a schematic diagram of a structure of the electronic device in the communication system shown in FIG. 2 according to an embodiment of this application.

As shown in FIG. 3, the electronic device 202 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment does not constitute a specific limitation on the electronic device 202. In some other embodiments of this application, the electronic device 202 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent devices, or may be integrated into one or more processors. For example, in this application, the processor 110 may obtain current status information.

The controller may be a nerve center and a command center of the electronic device 202. The controller may generate an operation view signal based on an instruction operation code and a time sequence signal, to complete control of instruction fetching and instruction execution.

A memory may be disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 202.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call by using a Bluetooth headset.

The PCM interface may also be used for audio communication, and analog signal sampling, quantization, and coding. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is used for asynchronous communication. The bus may be a two-way communications bus. The bus converts to-be-transmitted data between serial communication and parallel communication. In some embodiments, the UART interface is usually used to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI, to implement a photographing function of the electronic device 202. The processor 110 communicates with the display 194 through the DSI interface, to implement a display function of the electronic device 202.

The GPIO interface may be configured by using software. The GPIO interface may be configured as a control signal, or may be configured as a data signal. In some embodiments, the GPIO interface may be configured to connect the processor 110 to the camera 193, the display 194, the wireless communication module 160, the audio module 170, the sensor module 180, or the like. The GPIO interface may be configured as the I2C interface, the I2S interface, the UART interface, the MIPI interface, or the like.

The USB interface 130 is an interface that conforms to a USB standard specification, and may be specifically a mini USB interface, a micro USB interface, a USB Type C interface, or the like. The USB interface 130 may be configured to connect to a charger to charge the electronic device 202, or may be configured to transmit data between the electronic device 202 and a peripheral device, or may be configured to connect to a headset, to play audio by using the headset. The interface may be configured to connect to another electronic device such as an AR device.

It may be understood that an interface connection relationship between the modules that is shown in this embodiment is merely an example for description, and does not constitute a limitation on a structure of the electronic device 202. In some other embodiments of this application, the electronic device 202 may alternatively use an interface connection manner different from that in the foregoing embodiment, or use a combination of a plurality of interface connection manners.

The charging management module 140 is configured to receive charging input from the charger. The charger may be a wireless charger or a wired charger. In some embodiments of wired charging, the charging management module 140 may receive charging input from a wired charger through the USB interface 130. In some embodiments of wireless charging, the charging management module 140 may receive wireless charging input through a wireless charging coil of the electronic device 202. The charging management module 140 may further supply power to the electronic device by using the power management module 141 while charging the battery 142.

The power management module 141 is configured to connect the battery 142 and the charging management module 140 to the processor 110. The power management module 141 receives input from the battery 142 and/or the charging management module 140, and supplies power to the processor 110, the internal memory 121, the display 194, the camera 193, the wireless communication module 160, and the like. The power management module 141 may be configured to monitor parameters such as a battery capacity, a battery cycle count, and a battery health status (electric leakage and impedance). In some other embodiments, the power management module 141 may alternatively be disposed in the processor 110. In some other embodiments, the power management module 141 and the charging management module 140 may alternatively be disposed in a same component.

A wireless communication function of the electronic device 202 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 202 may be configured to cover one or more communication frequency bands. Different antennas may be multiplexed, to improve antenna utilization. For example, the antenna 1 may be multiplexed as a diversity antenna in a wireless local area network. In some other embodiments, an antenna may be used in combination with a tuning switch.

The mobile communication module 150 may provide a wireless communication solution that is applied to the electronic device 202 and that includes 2G/3G/4G/5G and the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by using an audio device (which is not limited to the speaker 170A, the receiver 170B, and the like), or displays an image or a video on the display 194. In some embodiments, the modem processor may be an independent component. In some other embodiments, the modem processor may be independent of the processor 110, and is disposed in the same device as the mobile communication module 150 or another functional module.

The wireless communication module 160 may provide a wireless communication solution that is applied to the electronic device 202 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 202 are coupled, and the antenna 2 and the wireless communication module 160 in the electronic device 202 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, Lib), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BD S), a quasi-zenith satellite system (quasi-zenith satellite system, QZSS), and/or a satellite based augmentation system (satellite based augmentation system, SBAS).

The electronic device 202 may implement a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 202 may include one or N displays 194, where N is a positive integer greater than 1.

A series of graphical user interfaces (graphical user interface, GUI) may be displayed on the display 194 of the electronic device 202, and these GUIs are all home screens of the electronic device 202. Generally, the display 194 of the electronic device 202 is in a fixed size, and only limited views can be displayed on the display 194 of the electronic device 202. The view is a GUI element. The view is a software component included in an application, and controls all data processed by the application and an interaction operation of the data. A user may interact with the view through direct manipulation (direct manipulation), to read or edit information about the application. Generally, the view may include visual interface elements such as an icon, a button, a menu, a tab, a text box, a dialog box, a status bar, a navigation bar, and a widget. For example, in this embodiment of this application, the display 194 may display a virtual button (one button orchestration, start orchestration, and stop orchestration).

The electronic device 202 can implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (charge-coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the electronic device 202 may include one or N cameras 193, where N is a positive integer greater than 1.

The digital signal processor is configured to process a digital signal, and may process another digital signal in addition to the digital image signal. For example, when the electronic device 202 selects a frequency, the digital signal processor is configured to perform Fourier transform on frequency energy.

The video codec is configured to: compress or decompress a digital video. The electronic device 202 may support one or more types of video codecs. Therefore, the electronic device 202 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transfer mode between human brain neurons, and may further continuously perform self-learning. Applications such as intelligent cognition of the electronic device 202, for example, image recognition, facial recognition, speech recognition, and text understanding, may be implemented through the NPU.

The external memory interface 120 may be configured to connect to an external storage card, for example, a micro SD card, to extend a storage capability of the electronic device 202. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 implements various function applications and data processing of the electronic device 202 by running the instructions stored in the internal memory 121. For example, in this embodiment, the processor 110 may perform scenario orchestration by executing the instructions stored in the internal memory 121. The internal memory 121 may include a program storage area and a data storage area. The program storage area may store an operating system, an application required by at least one function (for example, a sound playing function or an image playing function), and the like. The data storage area may store data (such as audio data and an address book) and the like that are created during use of the electronic device 202. In addition, the internal memory 121 may include a high-speed random access memory, and may further include a nonvolatile memory, for example, at least one magnetic disk storage device, a flash memory device, or a universal flash storage (universal flash storage, UFS). The processor 110 runs the instructions stored in the internal memory 121 and/or instructions stored in the memory disposed in the processor, to perform various function applications and data processing of the electronic device 202.

The electronic device 202 may implement an audio function, for example, music playing and recording, through the audio module 170, the speaker 170A, the receiver 170B, the microphone 170C, the headset jack 170D, the application processor, and the like.

The audio module 170 is configured to convert digital audio information into analog audio signal output, and is also configured to convert analog audio input into a digital audio signal. The audio module 170 may be configured to: code and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 202 may listen to music or answer a hands-free call by using the speaker 170A.

The receiver 170B, also referred to as an "earpiece", is configured to convert an electrical audio signal into a sound signal. When a call is answered or audio information is listened to by using the electronic device 202, the receiver 170B may be put close to a human ear to listen to a voice.

The microphone 170C, also referred to as a "mike" or a "mic", is configured to convert a sound signal into an electrical signal. When making a call or sending speech information, a user may place the mouth of the user near the microphone 170C to make a sound, to input a sound signal to the microphone 170C. At least one microphone 170C may be disposed in the electronic device 202. In some other embodiments, two microphones 170C may be disposed in the electronic device 202, to collect a sound signal and further implement a noise reduction function. In some other embodiments, three, four, or more microphones 170C may alternatively be disposed in the electronic device 202, to collect a sound signal, implement noise reduction, and identify a sound source, to implement a directional recording function and the like.

The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 202 determines pressure intensity based on a capacitance change. When a touch operation is performed on the display 194, the electronic device 202 detects intensity of the touch operation through the pressure sensor 180A. The electronic device 202 may calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on the Messages icon, an instruction for creating an SMS message is executed.

The gyro sensor 180B may be configured to determine a motion posture of the electronic device 202. In some embodiments, an angular velocity of the electronic device 202 around three axes (that is, axes x, y, and z) may be determined by using the gyro sensor 180B. The gyro sensor 180B may be configured to implement image stabilization during photographing. For example, when the shutter is pressed, the gyro sensor 180B detects an angle at which the electronic device 202 jitters, calculates, based on the angle, a distance for which a lens module needs to compensate, and allows the lens to cancel the jitter of the electronic device 202 through reverse motion, to implement image stabilization. The gyro sensor 180B may be used in a navigation scenario and a motion-sensing game scenario.

The barometric pressure sensor 180C is configured to measure barometric pressure. In some embodiments, the electronic device 202 calculates an altitude based on a value of the barometric pressure measured by the barometric pressure sensor 180C, to assist in positioning and navigation.

The magnetic sensor 180D includes a Hall sensor. The electronic device 202 may detect opening and closing of a flip cover by using the magnetic sensor 180D. In some embodiments, when the electronic device 202 is a clamshell phone, the electronic device 202 may detect opening and closing of a flip cover based on the magnetic sensor 180D. Further, a feature such as automatic unlocking upon opening of the flip cover is set based on a detected opening or closing state of the leather case or a detected opening or closing state of the flip cover.

The acceleration sensor 180E may detect accelerations in various directions (usually on three axes) of the electronic device 202. When the electronic device 202 is still, a magnitude and a direction of gravity may be detected. The acceleration sensor 180E may be configured to identify a posture of the electronic device, and is used in an application such as switching between a landscape mode and a portrait mode or a pedometer.

The distance sensor 180F is configured to measure a distance. The electronic device 202 may measure a distance in an infrared manner or a laser manner. In some embodiments, in a photographing scenario, the electronic device 202 may measure a distance by using the distance sensor 180F, to implement quick focusing.

The optical proximity sensor 180G may include a light-emitting diode (LED) and an optical detector, for example, a photodiode. The light-emitting diode may be an infrared light-emitting diode. The electronic device 202 emits infrared light by using the light-emitting diode. The electronic device 202 detects infrared reflected light from a nearby object by using the photodiode. When sufficient reflected light is detected, the electronic device 202 may determine that there is an object near the electronic device 100. When insufficient reflected light is detected, the electronic device 202 may determine that there is no object near the electronic device 202. The electronic device 202 may detect, by using the optical proximity sensor 180G, that the user holds the electronic device 202 close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The electronic device 202 may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the electronic device 202 is in a pocket, to avoid an accidental touch.

The fingerprint sensor 180H is configured to collect a fingerprint. The electronic device 202 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 202 executes a temperature processing policy based on the temperature detected by the temperature sensor 180J. For example, when the temperature reported by the temperature sensor 180J exceeds a threshold, the electronic device 202 lowers performance of a processor near the temperature sensor 180J, to reduce power consumption and implement thermal protection. In some other embodiments, when the temperature is less than another threshold, the electronic device 202 heats the battery 142 to prevent the electronic device 202 from being shut down abnormally due to a low temperature. In some other embodiments, when the temperature is less than still another threshold, the electronic device 202 boosts an output voltage of the battery 142 to avoid abnormal shutdown due to a low temperature.

The touch sensor 180K is also referred to as a "touch component". The touch sensor 180K may be disposed on the display 194, and the touch sensor 180K and the display 194 form a touchscreen, also referred to as a "touch screen". The touch sensor 180K is configured to detect a touch operation performed on or near the touch sensor. The touch sensor may transfer the detected touch operation to the application processor to determine a type of a touch event. Visual output related to the touch operation may be provided through the display 194. In some other embodiments, the touch sensor 180K may alternatively be disposed on a surface of the electronic device 202 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal. In some embodiments, the bone conduction sensor 180M may alternatively be disposed in the headset, to constitute a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 202 may receive button input, and generate button signal input related to user settings and function control of the electronic device 202.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. For touch operations performed on different areas of the display 194, the motor 191 may also correspond to different vibration feedback effects. Different application scenarios (for example, time reminding, information receiving, an alarm clock, and a game) may also correspond to different vibration feedback effects. A touch vibration feedback effect may be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 202. The electronic device 202 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 is compatible with different types of SIM cards. The SIM card interface 195 is also compatible with an external storage card. The electronic device 202 interacts with a network through the SIM card, to implement functions such as calling and data communication. In some embodiments, the electronic device 202 uses an eSIM, that is, an embedded SIM card. The eSIM card may be embedded into the electronic device 202, and cannot be separated from the electronic device 202.

In addition, an operating system runs on the foregoing components, for example, an iOS operating system developed by Apple, an Android open source operating system developed by Google, a Windows operating system developed by Microsoft, and a Harmony operating system developed by Huawei. An application may be installed and run in the operating system.

An operating system of the electronic device 202 may use a layered architecture, an event-driven architecture, a microkernel architecture, a micro service architecture, or a cloud architecture. In this embodiment of this application, an Android system of a layered architecture is used as an example to illustrate a software structure of the electronic device 202.

Figure 4:
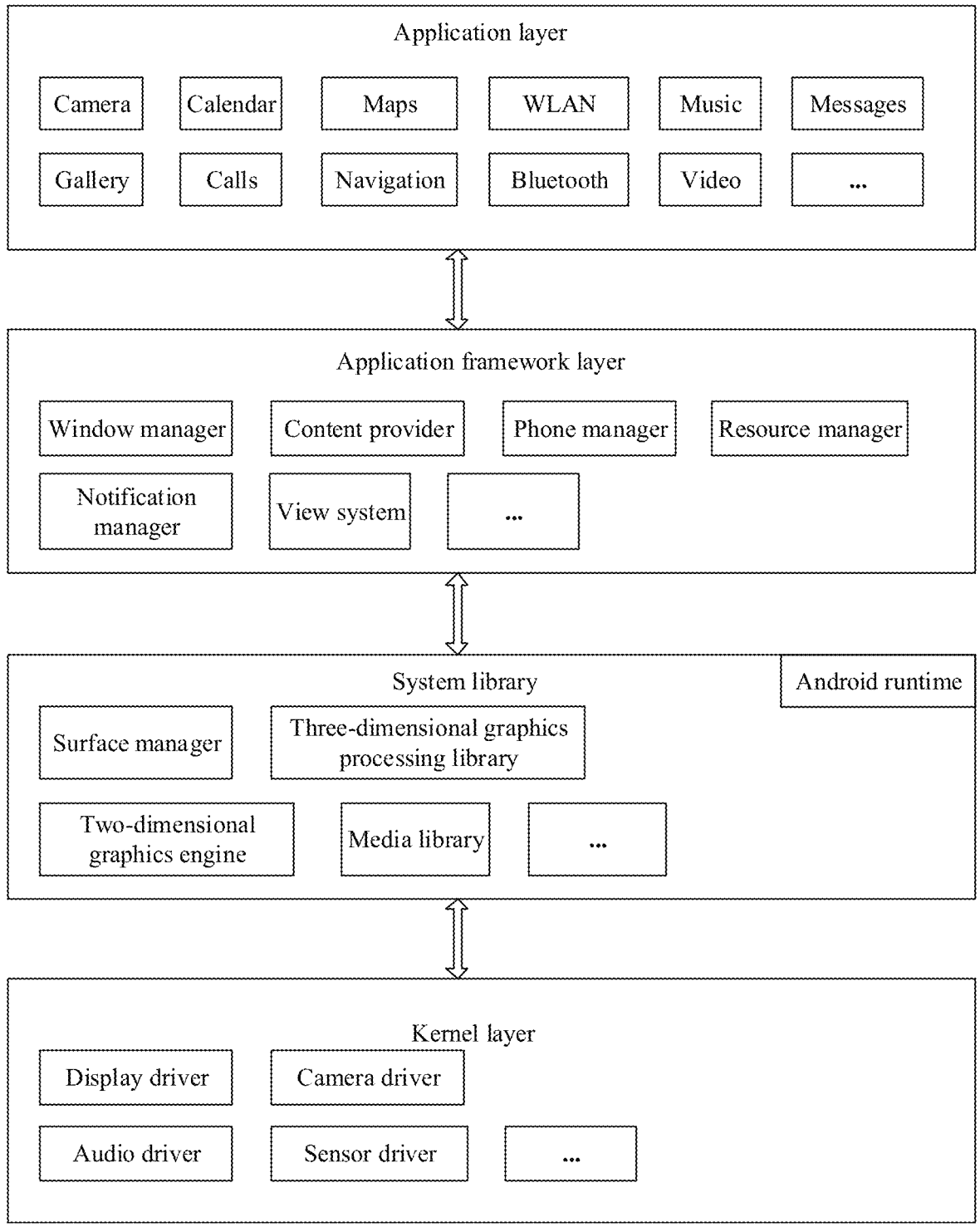
FIG. 4 is a block diagram of a software structure of an electronic device according to an embodiment of this application.

FIG. 4 is a block diagram of a software structure of the electronic device 202 according to an embodiment of this application.

In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages. As shown in FIG. 4, the application package may include applications such as Camera, Gallery, Calendar, Calls, Map, Navigation, WLAN, Bluetooth, Music, Video, and Messages.

The application framework layer provides an application programming interface (application programming interface, API) and a programming framework for an application at the application layer. The application framework layer includes some predefined functions. As shown in FIG. 4, the application framework layer may include a window manager, a content provider, a view system, a phone manager, a resource manager, a notification manager, and the like. For example, in this embodiment of this application, during scenario orchestration, the application framework layer may provide an API related to a scenario orchestration function for the application layer, and provide a scenario orchestration interface management service for the application layer, to implement the scenario orchestration function.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views. For example, a display interface including a notification icon of Messages may include a text display view and a picture display view.

The phone manager is configured to provide a communication function of the electronic device 202, for example, management of a call status (including answering, declining, or the like).

The resource manager provides, for an application, various resources such as a localized character string, an icon, a picture, a layout file, and a video file.

The notification manager enables an application to display notification information in the status bar, and may be configured to transmit a notification-type message. The displayed information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be invoked in Java language, and a kernel library of Android.

The application layer and the application framework layer run on a virtual machine. The virtual machine executes Java files at the application layer and the application framework layer as binary files. The virtual machine is configured to perform functions such as object lifecycle management, stack management, thread management, security and exception management, and garbage collection.

The system library may include a plurality of functional modules, such as a surface manager (surface manager), a media library (Media Library), a three-dimensional graphics processing library (such as OpenGL ES), or a 2D graphics engine (such as SGL).

The surface manager is configured to manage a display subsystem and provide fusion of 2D and 3D layers for a plurality of applications.

The media library supports playback and recording of a plurality of commonly used audio and video formats, static image files, and the like. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

It should be noted that although an Android system is used as an example for description in this embodiment of this application, a basic principle of the embodiment of this application is also applicable to an electronic device based on an operating system such as iOS or Windows.

In this application, the sewer 201 may be a server that provides a video or picture service, and is for example, a server of Youku, a server of iQIYI, or a server of a cloud game. A user may obtain, from the server by using the electronic device, data related to a video or a picture, and watch the picture or the video or play the cloud game. It may be understood that the video service in this application may be a cloud video service. The video may be understood as a generalized video, for example, a virtual reality (virtual reality, VR) video/augmented reality (augmented reality, AR) video, an image video, or a game video.

Currently, a screen of a touchscreen of the electronic device is increasingly large, and there are also increasingly more size ratios of the screen. A multimedia information picture is usually in only a few fixed types of ratios in an application interface, such as 4:3, 16:9, or 9:16. A picture ratio of multimedia information of blue-ray high-definition 1920×1080 and 4 K high-definition 4096×2304 is generally 16:9, and a picture ratio of multimedia information of 640×480 is generally 4:3. Therefore, when the multimedia information is played on an electronic device whose screen size does not match the multimedia information, in one manner, as shown in FIG. 1a, the electronic device may keep an original picture ratio and perform scaling processing on a multimedia information picture, so that height of the multimedia information picture fills an entire screen, symmetrical space is left on a left side and a right side, and the space is filled with fixed color (such as black) or may certainly be filled with other color. In another manner, as shown in FIG. 1B, the electronic device may keep an original picture ratio and perform scaling processing on a multimedia information picture, so that width of the multimedia information picture fills an entire screen, symmetrical space is left on an upper side and a lower side, and the space is filled with fixed color (such as black) or may certainly be filled with other color. In addition, when a user needs to perform a corresponding operation on the multimedia information in a process of viewing the multimedia information, the user may invoke an operation view by tapping the screen. For example, if the multimedia information is a video, the user may invoke one or more of operation views "bullet screen", "speed multiplier", "topspeed", and "episode selection", a progress bar view, a play and pause control view, and the like. Currently, as shown in FIG. 1a and FIG. 1B, all operation views are superposed on a video picture for display.

In addition, for a foldable screen, due to particularity of a size of a display screen of the foldable screen, a ratio of a playback picture of multimedia information does not match a ratio of the display screen, and therefore, space filled with fixed color (such as black) is relatively large.

Figure 5A:
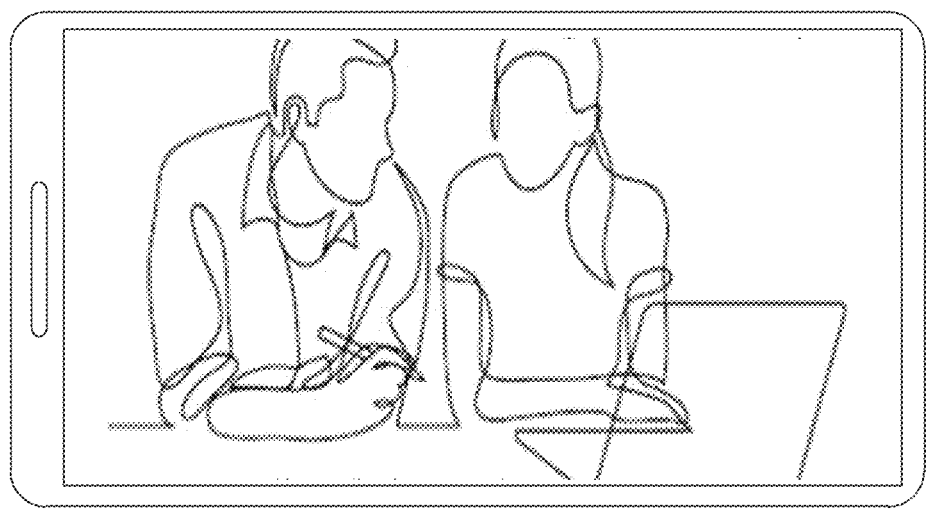
FIG. 5a is a schematic diagram obtained after a video picture in FIG. 1a is centered and cut.

In the foregoing display manner in a conventional technology, when a multimedia information picture does not match a screen size, black areas may appear on an upper part and a lower part or a left part and a right part of a screen, and consequently, utilization of the screen is low. To resolve this problem, the picture may be enlarged and then centered and cut. As an example for description below, the multimedia information is a video. Specifically, FIG. 5a is a schematic diagram obtained after a video picture in FIG. 1a is centered and cut. As shown in FIG. 5a, the video picture is enlarged while an original video picture ratio remains unchanged, so that width of the video picture also fills the screen. In this case, in a height direction, the video picture exceeds a visible area on the screen, and the electronic device may cut an upper part and a lower part of the picture that exceeds the visible area on the screen in the height direction. In this way, there is no black area on the entire screen.

Figure 5B:
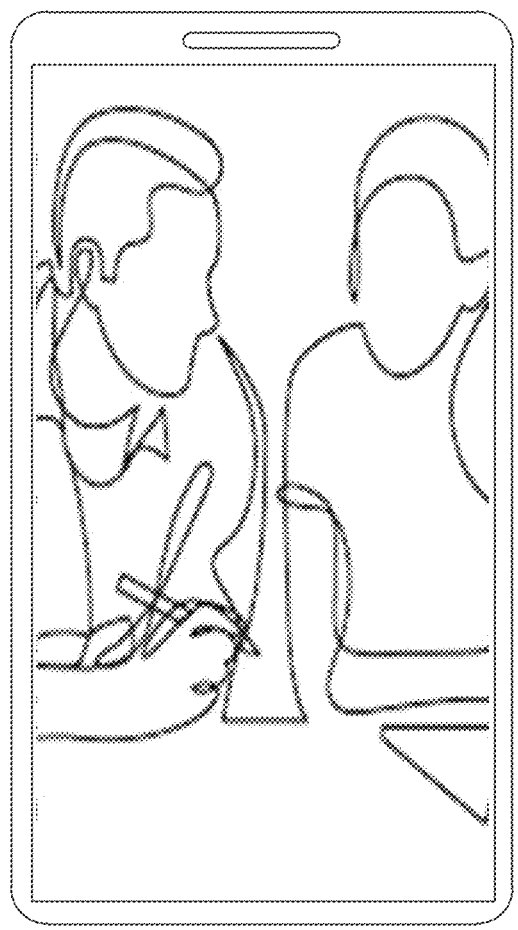
FIG. 5b is a schematic diagram obtained after a video picture in FIG. 1B is centered and cut.

FIG. 5b is a schematic diagram obtained after a video picture in FIG. 1B is centered and cut. As shown in FIG. 5b, the video picture is enlarged while an original video picture ratio remains unchanged, so that height of the video picture also fills the screen. In this case, in a horizontal direction, the video picture exceeds a visible area on the screen, and the electronic device may cut a left part and a right part of the picture that exceeds the visible area on the screen in the horizontal direction. In this way, there is no black area on the entire screen.

However, although the screen of the electronic device is fully used in the foregoing manner, a part of the picture is lost because the upper part and the lower part or the left part and the right part of the original video picture are cut, and therefore, information integrity is destroyed, and viewing experience of the user is significantly affected.

To resolve the foregoing problem, an embodiment of this application provides a display control method. In the method, first size information of a screen of an electronic device, second size information of to-be-played multimedia information, and an operation view used to control the multimedia information are separately obtained, and then a first area that is on the screen and in which the multimedia information is displayed is determined based on the first size information and the second size information, and the operation view is displayed in a second area other than the first area on the screen. The multimedia information is displayed in the first area, and the operation view is displayed in the second area other than the first area; in other words, the multimedia information and the operation view are separated for display. Therefore, utilization of the second area can be improved. In addition, because all areas on the screen are used, utilization of the screen can be improved. Further, because the multimedia information and the operation view are separated for display, a phenomenon in a conventional technology that the operation view is superposed on the multimedia information for display is avoided, and therefore, a display effect of a picture can be effectively improved.

Before the technical solutions of this application are described, related concepts of a display screen of an electronic device in this application are first described.

Horizontal length of the display screen is length of the display screen of the electronic device in a horizontal direction.

Vertical length of the display screen is length of the display screen of the electronic device in a vertical direction, or may be understood as length in a height direction.

Horizontal length of an area occupied by multimedia information is length, in the horizontal direction, of an area that is on the display screen of the electronic device and in which the multimedia information is displayed.

Vertical length of the area occupied by the multimedia information is length, in the vertical direction or the height direction, of the area that is on the display screen of the electronic device and in which the multimedia information is displayed.

A horizontal-to-vertical ratio of the display screen is a ratio of the horizontal length of the display screen to the vertical length of the display screen.

A horizontal-to-vertical ratio of the area occupied by the multimedia information is a ratio of the horizontal length of the area occupied by the multimedia information to the vertical length of the area occupied by the multimedia information.

It should be noted that, regardless of how the electronic device rotates, the horizontal length of the display screen is length of the electronic device in the horizontal direction, and the vertical length of the display screen is length of the electronic device in the vertical direction. In other words, after the electronic device is rotated by 90°, horizontal length before rotation becomes vertical length after rotation, and vertical length before rotation becomes horizontal length after rotation.

The horizontal length of the area occupied by the multimedia information and the vertical length of the area occupied by the multimedia information are similar to the horizontal length and the vertical length of the display screen. Details are not described herein again.

It is assumed that the horizontal length of the display screen is $Display_{width}$ and the vertical length is $Display_{height}$, and therefore, the horizontal-to-vertical ratio (a width-to-height ratio) of the display screen is ratio=$Display_{width}/Display_{height}$ It may be understood that a display screen whose horizontal-to-vertical ratio (width-to-height ratio) is greater than 0.75 and less than 1.33 may be defined as a square screen, and a display screen whose horizontal-to-vertical ratio (width-to-height ratio) is greater than 9:20 is defined as a long screen.

Figure 6:
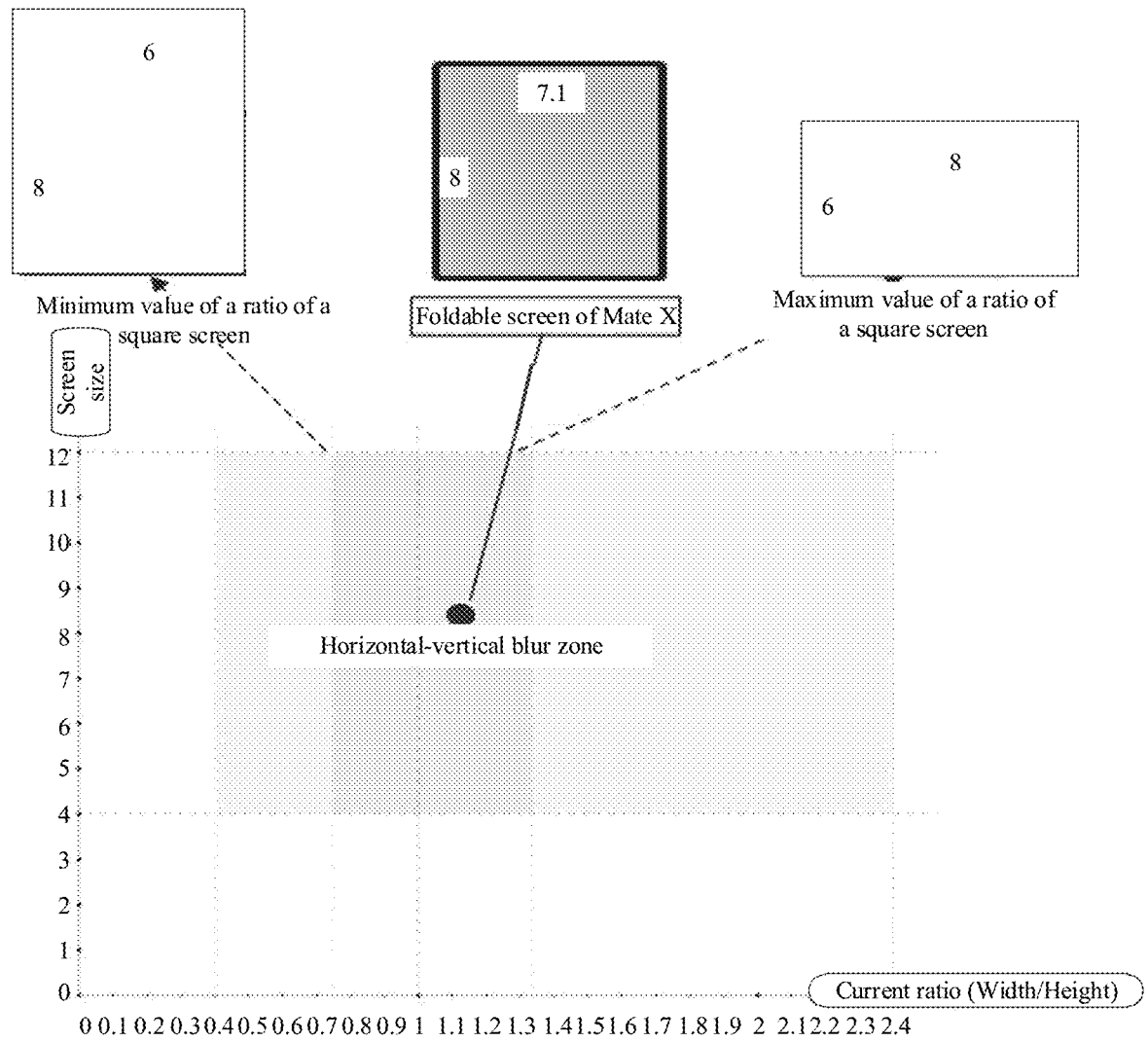
FIG. 6 is a schematic diagram of a ratio of a display screen.

FIG. 6 is a schematic diagram of a ratio of a display screen. As shown in FIG. 6, currently, a screen size of the electronic device is generally between 4 inches and 12 inches. In addition, a display screen in an area (for example, a horizontal-vertical blur zone in FIG. 6) whose horizontal-to-vertical ratio is between 0.75 and 1.33 is the square screen described in embodiments of this application, and a display screen in areas (for example, other areas other than the horizontal-vertical blur zone in FIG. 6) whose horizontal-to-vertical ratio is between 0.4 and 0.75 and between 1.33 and 2.4 is the long screen in embodiments of this application.

In addition, as shown in FIG. 6, for the square screen, a minimum value of a horizontal-to-vertical ratio (width-to-height ratio) of the display screen is 6/8, that is, 0.75, and a maximum value of the horizontal-to-vertical ratio (width-to-height ratio) of the display screen is 8/6, that is, 1.33. For example, a horizontal-to-vertical ratio (width-to-height ratio) of a foldable screen of Mate X is 7.1/8, and is between 0.75 and 1.33. Therefore, the foldable screen of Mate X is the square screen described in embodiments of this application.

It should be noted that setting of the screen size of the electronic device and the horizontal-to-vertical ratios (width-to-height ratios) of the square screen and the long screen in FIG. 6 is merely an example. In specific application, the size of the display screen and the horizontal-to-vertical ratios (width-to-height ratios) of the square screen and the long screen may be set to a different case based on an actual situation. This is not limited in this embodiment of this application.

Technical solutions of the display control method provided in this application are described in detail below by using detailed embodiments. The following several specific embodiments may be combined with each other, and a same or similar concept or process may not be described repeatedly in some embodiments.

Figure 7:
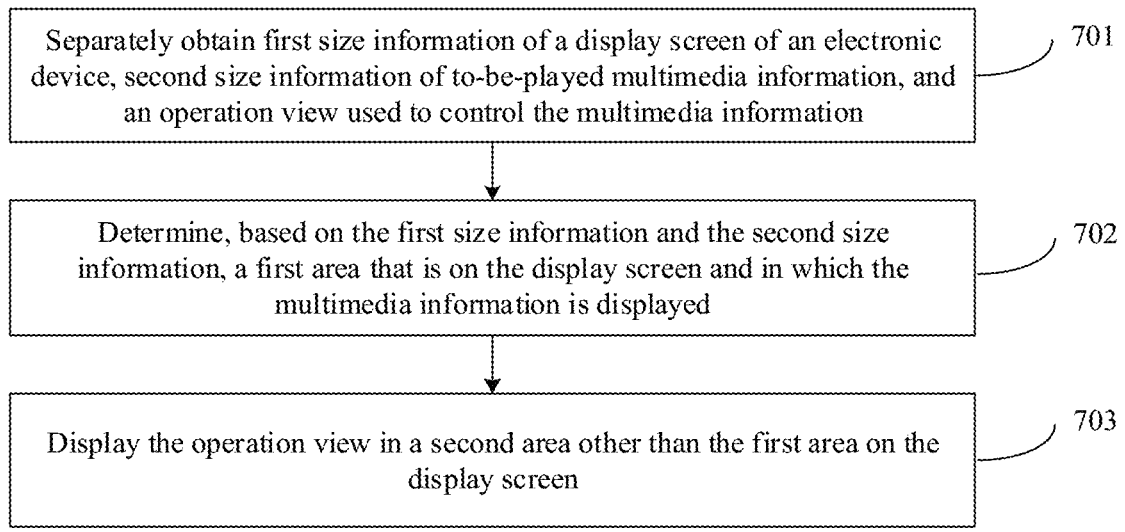
FIG. 7 is a schematic flowchart of a display control method according to an embodiment of this application.

FIG. 7 is a schematic flowchart of a display control method according to an embodiment of this application. It should be noted that, although in this embodiment of this application, steps of the method are presented in a specific sequence, the sequence of the steps may be changed in different embodiments, and in some embodiments, one or more steps shown in the sequence in this specification may be simultaneously performed. As shown in FIG. 7, the method includes the following steps.

Step 701: Separately obtain first size information of a display screen of an electronic device, second size information of to-be-played multimedia information, and an operation view used to control the multimedia information.

In this step, the first size information may be a horizontal-to-vertical ratio (width-to-height ratio) of the display screen, and the second size information may be a horizontal-to-vertical ratio (width-to-height ratio) of a playback picture when the multimedia information is played. In addition, the first size information may alternatively be width and height of the display screen, and the second size information may alternatively be width and height of the playback picture when the multimedia information is played. A size of the display screen of the electronic device generally does not change after delivery, and the first size information may be pre-stored in the electronic device.

Figure 8A:
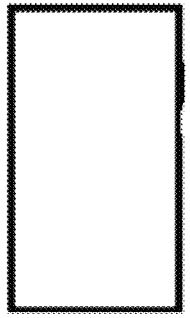
FIG. 8a is a schematic diagram of a primary screen.
Figure 8B:
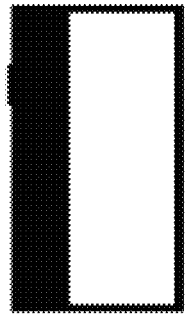
FIG. 8b is a schematic diagram of a secondary screen.
Figure 8C:
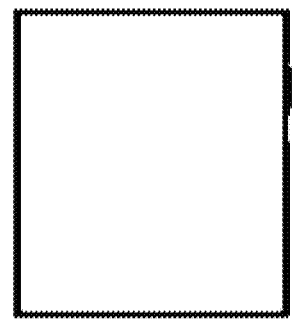
FIG. 8c is a schematic diagram of an unfolded screen.

It should be noted that, a foldable screen includes a folded primary screen, a folded secondary screen, and an unfolded screen. FIG. 8a is a schematic diagram of the primary screen. FIG. 8b is a schematic diagram of the secondary screen. FIG. 8c is a schematic diagram of the unfolded screen. As shown in FIG. 8a, the primary screen of the foldable screen may also be understood as a primary screen, and is a main screen used by the user by default when the foldable screen is in a folded state. As shown in FIG. 8b, the secondary screen of the foldable screen is a secondary screen used by the user when the foldable screen is in a folded state. When the display screen is in the folded state, size information of a lighted part of the display screen is third size information, the multimedia information is displayed on the display screen, and the operation view for controlling the multimedia information is superposed on the multimedia information. It should be understood that, that the display screen is in the folded state may be understood that the display screen is entirely folded. As shown in FIG. 8c, the unfolded screen of the foldable screen is a screen used by the user when the foldable screen is in the unfolded state. Generally, a screen size of the unfolded screen is larger than a screen size of the primary screen and a screen size of the secondary screen. In addition, when the foldable screen is in the unfolded state, the size information of the display screen is the first size information.

In summary, because the foldable screen includes the primary screen, the secondary screen, and the unfolded screen, the foldable screen generally includes a plurality of pieces of size information, such as third size information of the primary screen, third size information of the secondary screen, and first size information of the unfolded screen. In addition, when the foldable screen is in the folded state or in the unfolded state, a size of the foldable screen is also fixed; in other words, the third size information of the primary screen, the third size information of the secondary screen, and the first size information of the unfolded screen are all fixed, and the size information may also be pre-stored in the foldable screen.

In addition, the electronic device may traverse views of the multimedia information to obtain the operation view used to control the multimedia information.

It may be understood that a view for rendering the multimedia information is different for an interface of an application (application, APP). When the multimedia information is played, the second size information occupied by the multimedia information on the display screen may be different. Therefore, a correspondence between identification information and size information of a video view may be pre-stored in the electronic device. After receiving a third operation instruction triggered by a user, and detecting, according to the third operation instruction, that the user opens an interface of an APP, the electronic device obtains, based on a video view used to render the multimedia information in the interface and the pre-stored correspondence between identification information and size information of a video view, second size information corresponding to a view that is in the interface opened by the user and that is used to render the multimedia information.

In addition, for example, the multimedia information may include a picture or a video.

Step 702: Determine, based on the first size information and the second size information, a first area that is on the display screen and in which the multimedia information is displayed.

In this step, after the first size information and the second size information are obtained, the first area that is on the electronic device and in which the multimedia information is displayed may be determined based on the first size information and the second size information. If the second size information is equal to the first size information, the multimedia information fills the entire display screen of the electronic device. This may also be understood as follows: A screen occupied by the first area is the entire display screen of the electronic device. In this case, there is no black area on the entire display screen of the electronic device, or there is no black edge on the entire display screen of the electronic device.

If the second size information is less than the first size information, the multimedia information is displayed only in a partial area of the electronic device. This may also be understood as follows: A screen occupied by the first area is a part of the display screen of the electronic device. In this case, there is a black area on the display screen of the electronic device, or there is a black edge on the display screen of the electronic device.

For example, the multimedia information is generally displayed in a middle area of the display screen. In other words, the first area is generally at a middle position of the display screen. When width of a playback picture of the multimedia information fills the display screen, there are black areas at an upper edge position and a lower edge position of the display screen; or when height of the playback picture of the multimedia information fills the display screen, there are black areas at a left edge position and a right edge position of the display screen.

Step 703: Display the operation view in a second area other than the first area on the display screen.

In this step, the second area may be understood as a black area that may alternatively be referred to as a black edge, that is, an area in which the multimedia information is not displayed. After traversing all views corresponding to the multimedia information, when the electronic device determines that the multimedia information has an operation view for interacting with the user, the electronic device may control to display the operation view in the second area. In this way, utilization of the second area can be improved. In addition, the playback picture of the multimedia information and the operation view are separated for display, so that a phenomenon in a conventional technology that the operation view is superposed on the playback picture of the multimedia information is avoided, and therefore, a display effect of the multimedia information can be improved.

Figure 9:
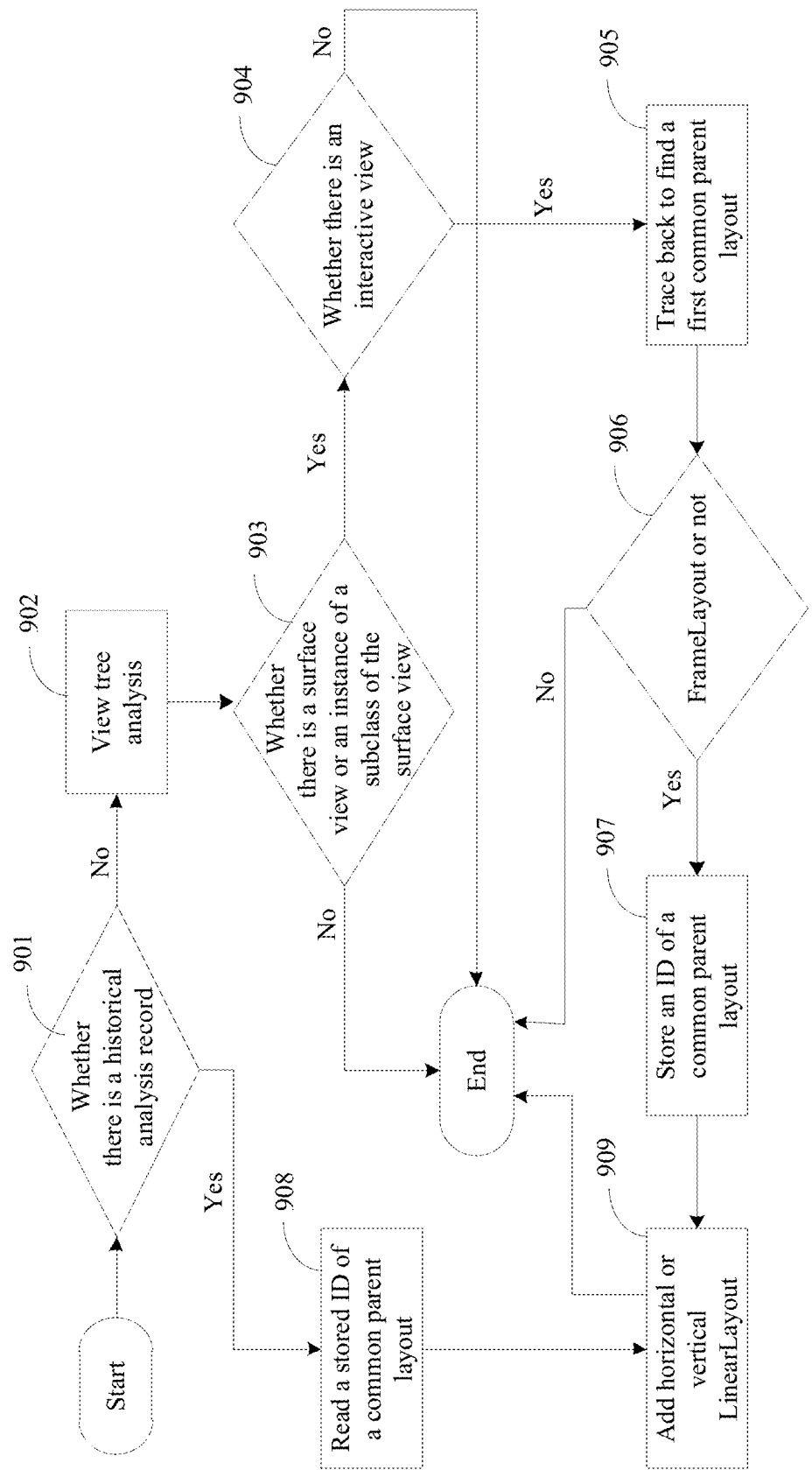
FIG. 9 is another schematic flowchart of a display control method according to an embodiment of this application.

FIG. 9 is another schematic flowchart of a display control method according to an embodiment of this application. As shown in FIG. 9, the method includes the following steps.

Step 901: Analyze whether there is a historical analysis record.

Specifically, for a view that is in an interface of an application or a web page and that is used to render multimedia information, a ratio of a player used to play the multimedia information is fixed. Therefore, when separating a playback picture of the multimedia information from an operation view for display, an electronic device searches for, when detecting that an activity component Activity of a video application is started, whether there is the historical analysis record in the electronic device. The historical analysis record includes whether a view that is in an interface for playing the multimedia information and that is used to render the multimedia information is analyzed. If there is the historical analysis record, the operation view may be directly processed based on a previous analysis record, so that repeated operations can be avoided, and processing efficiency is improved.

If there is the historical analysis record in the electronic device, step 908 is performed; or otherwise, step 902 is performed.

Step 902: The electronic device analyzes a view tree.

In this step, the view in the interface of the application or the web page is generally stored in a tree structure. Therefore, if there is no historical analysis record in the electronic device, the stored view tree (viewtree) is analyzed.

As shown in FIG. 4, the view tree (viewtree) is included in an application framework layer in an Android system, and may be specifically included in an interface system of the application framework layer.

Step 903: Whether there is a surface view or an instance of a subclass of the surface view.

In this step, when analyzing the view tree, the electronic device may determine, by traversing all views, whether there is a view used to render or draw the multimedia information. For example, it may be determined whether there is a view used to render or draw a video or a picture, for example, perform searching to determine whether there is a video view, that is, a surface view, or an instance of a subclass of the surface view. The surface view or the instance of the subclass of the surface view is a view used to render a video.

If there is the surface view or the instance of the subclass of the surface view, step 904 is performed; or otherwise, an entire processing procedure ends.

The surface view is included in the interface system of the application framework layer.

Step 904: Determine whether there is an interactive view.

In this step, the interactive view may be understood as a view for interacting with a user, or may be understood as a user-oriented operation view, that is, a view that the user may operate or tap, for example, a Button view or an EditText view.

If there is the interactive view, step 905 is performed; or otherwise, the electronic device does not perform any processing or change on the view, and ends the entire processing procedure.

Step 905: Trace back to find a first common parent layout of the surface view and the interactive view.

In this step, if there is the interactive view that can interact with the user, the electronic device traces back to find the first common parent layout of the surface view and the interactive operation view. The parent layout may be understood as a parent node.

Figure 10:
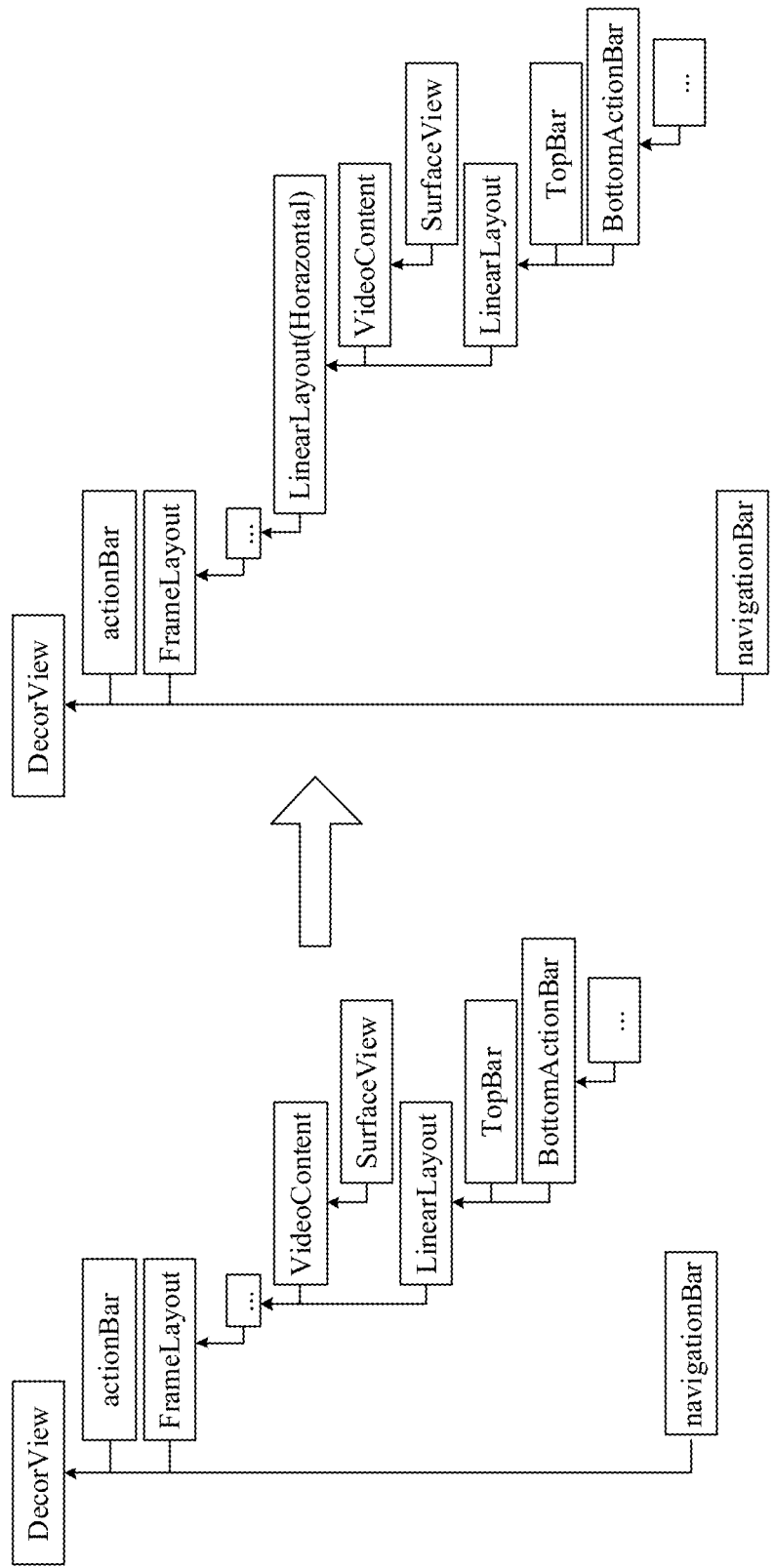
FIG. 10 is a schematic diagram of a view tree.

FIG. 10 is a schematic diagram of a view tree. As shown in FIG. 10, the electronic device determines, by analyzing all views, that there is a surface view (surface view), and determines that there is an interactive operation view such as TopBar or BottomActionBar. The electronic device may determine that a parent layout of the surface view (surface view) is VideoContent, and a parent layout of the interactive operation view such as TopBar or BottomActionBar is LinearLayout, and the electronic device may determine, based on VideoContent and LinearLayout, that a first common parent layout of the surface view (surface view) and the interactive operation view such as TopBar or BottomActionBar is FrameLayout.

Figure 11:
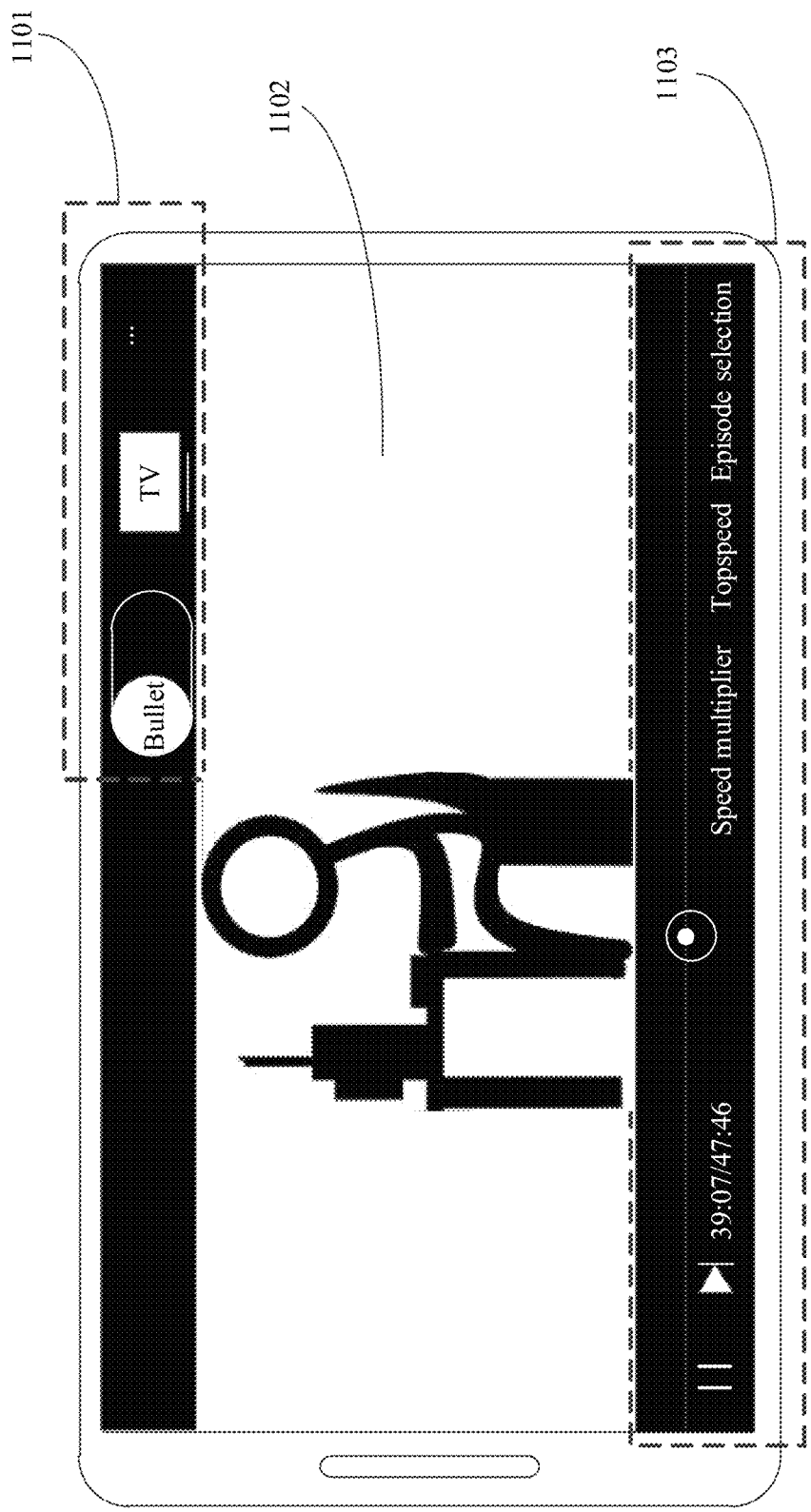
FIG. 11 is a schematic diagram of a video application.

For example, FIG. 11 is a schematic diagram of a video application. An operation view 1101 may be TopBar, an operation view 1103 may be BottomActionBar, a surface view used to render a video is 1102, a parent layout of the surface view 1102 is VideoContent, and a parent layout of the operation view 1101 and the operation view 1103 is LinearLayout.

Step 906: Determine whether the first common parent layout is FrameLayout.

FrameLayout is a view that is used by the user to fold a video picture and the interactive operation view for display.

If the first common parent layout is FrameLayout, step 907 is performed; or otherwise, the entire processing procedure ends.

Step 907: Store an ID of the first common parent layout.

In this step, the electronic device may store a correspondence between the ID of the common parent layout and identification information of a view that is in an application or a web page and that is used to render multimedia information.

The ID of the first common parent layout is stored, so that when a view that is in an interface of a same application or a web page and that is used to render the multimedia information is subsequently processed, step 902 to step 907 may not be performed, and the ID stored in the electronic device is directly read, that is, step 908 is performed.

After step 907 is performed, step 909 is performed.

Step 908: Read the stored ID of the first common parent layout.

In this step, if the electronic device detects that the multimedia information is played by using a view in an application or a web page, a terminal device reads, based on identification information of the view in the interface of the application or the web page, the ID that is of the first common parent layout and that is corresponding to the identification information, so that view processing efficiency can be improved.

Step 909: Add horizontal or vertical LinearLayout.

In this step, as shown in FIG. 10, if it is found that the first common parent layout of the surface view (surface view) and the interactive operation view such as TopBar or BottomActionBar is FrameLayout, a LinearLayout (Horizontal) view may be added between FrameLayout and respective parent layouts of the surface view (surface view) and the interactive operation view such as TopBar or BottomActionBar; in other words, the first common parent layout of the surface view (surface view) and the interactive operation view such as TopBar or BottomActionBar is set to the LinearLayout (Horizontal) view.

As shown in FIG. 11, a first common parent layout of the operation view 1101, the operation view 1103, and the surface view 1102 may be set to the LinearLayout (Horizontal) view.

In addition, a ratio of the LinearLayout (Horizontal) view to FrameLayout may be set to 1:1, so that it can be ensured that a size of a container corresponding to FrameLayout is equal to a size of a container corresponding to LinearLayout (Horizontal). Certainly, the LinearLayout (Horizontal) view may be set to another size based on actual application.

The LinearLayout (Horizontal) view is a view that is obtained after the interactive operation view such as TopBar or BottomActionBar is in a horizontal streaming layout. In another implementation, a LinearLayout (Vertical) view may also be used to control the interactive operation view to be in a vertical linear layout.

In this embodiment, the LinearLayout (Horizontal) view or the LinearLayout (Vertical) view is added to the view tree, so that the operation view can be controlled to be in the horizontal streaming layout or the vertical linear layout, to separate a display area of the multimedia information from a display area of the operation view. In this way, a display effect of the multimedia information can be improved.

For example, when the operation view is displayed in the second area, the operation view may be displayed in a fixed and unfolded manner or in a folded and shrunk manner based on first size information of a display screen and second size information of the to-be-displayed multimedia information.

Specifically, the electronic device may provide a foldable layout (FoldableLayout). The foldable layout includes 1+N views (View), and N is an integer greater than or equal to 1. One view (View) is a body container, the body container fills the display screen, and regardless of how a size of the display screen changes, a ratio of content in the body container is ensured to remain unchanged. For example, the body container may be configured to fill the multimedia information such as a video or a picture. Other N views (View) are foldable containers, the N views (View) may include an interactive view (View), and the N views (View) may be arranged at least one position of an upper part, a lower part, a left side, or a right side of the display screen. In addition, the N foldable containers may be displayed in a fixed and unfolded manner, or may be displayed in a folded and shrunk manner.

The body container is configured to fill the multimedia information, and the N foldable containers are configured to fill the operation view. An area occupied when the multimedia information is played on the display screen is a first area; in other words, the second size information of the multimedia information is size information of the first area. When a horizontal-to-vertical ratio of the display screen is much smaller than a horizontal-to-vertical ratio of the first area, or the horizontal-to-vertical ratio of the display screen is much larger than the horizontal-to-vertical ratio of the first area, this may also be understood as follows: When a difference between the horizontal-to-vertical ratio of the display screen and the horizontal-to-vertical ratio of the first area is greater than a first preset value, it indicates that an area of a second area other than the first area on the display screen is relatively large. In this case, the operation view may also be controlled to be displayed in the second area in a fixed and unfolded manner.

The horizontal-to-vertical ratio of the first area is a horizontal-to-vertical ratio of an area occupied by the multimedia information.

Figure 12:
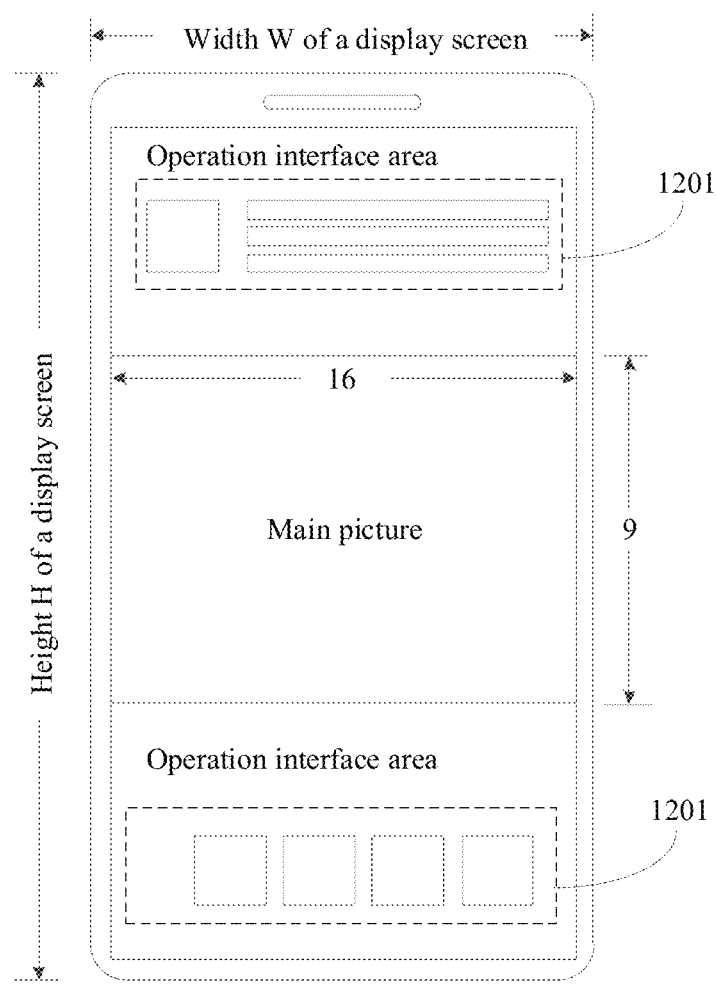
FIG. 12 is a schematic diagram of display of an operation view.

FIG. 12 is a schematic diagram of display of an operation view. As shown in FIG. 12, a first area used to play the multimedia information is a main picture; in other words, the second size information of the multimedia information is size information of the main picture. A horizontal-to-vertical ratio of the display screen is W/H, and a horizontal-to-vertical ratio of the main picture is 16/9. Because the horizontal-to-vertical ratio W/H of the display screen is much smaller than the horizontal-to-vertical ratio 16/9 of the main picture, that is, a difference between the horizontal-to-vertical ratio W/H of the display screen and the horizontal-to-vertical ratio 16/9 of the main picture is greater than the first preset value, an operation view 1201 may be controlled to be displayed in the second area in a fixed and unfolded manner. For example, the operation view 1201 may be displayed in an operation interface area in a fixed and unfolded manner. The operation view 1201 may be displayed in a same second area in a centralized manner. For example, when width of the main picture fills the entire screen, the second area may be located in an upper part and/or a lower part of the display screen. Therefore, the operation view 1201 may be entirely displayed in an operation interface area in the upper part of the display screen, or the operation view 1201 may be entirely displayed in an operation interface area in the lower part of the display screen. In addition, the operation view 1201 may alternatively be separately displayed in different second areas. As shown in FIG. 12, the operation view 1201 may be partially displayed in the operation interface area in the upper part of the display screen, and partially displayed in the operation interface area in the lower part of the display screen. A specific display position of each operation view 1201 is not limited in this embodiment of this application provided that the operation view 1201 and the main picture are separated for display.

Figure 13:
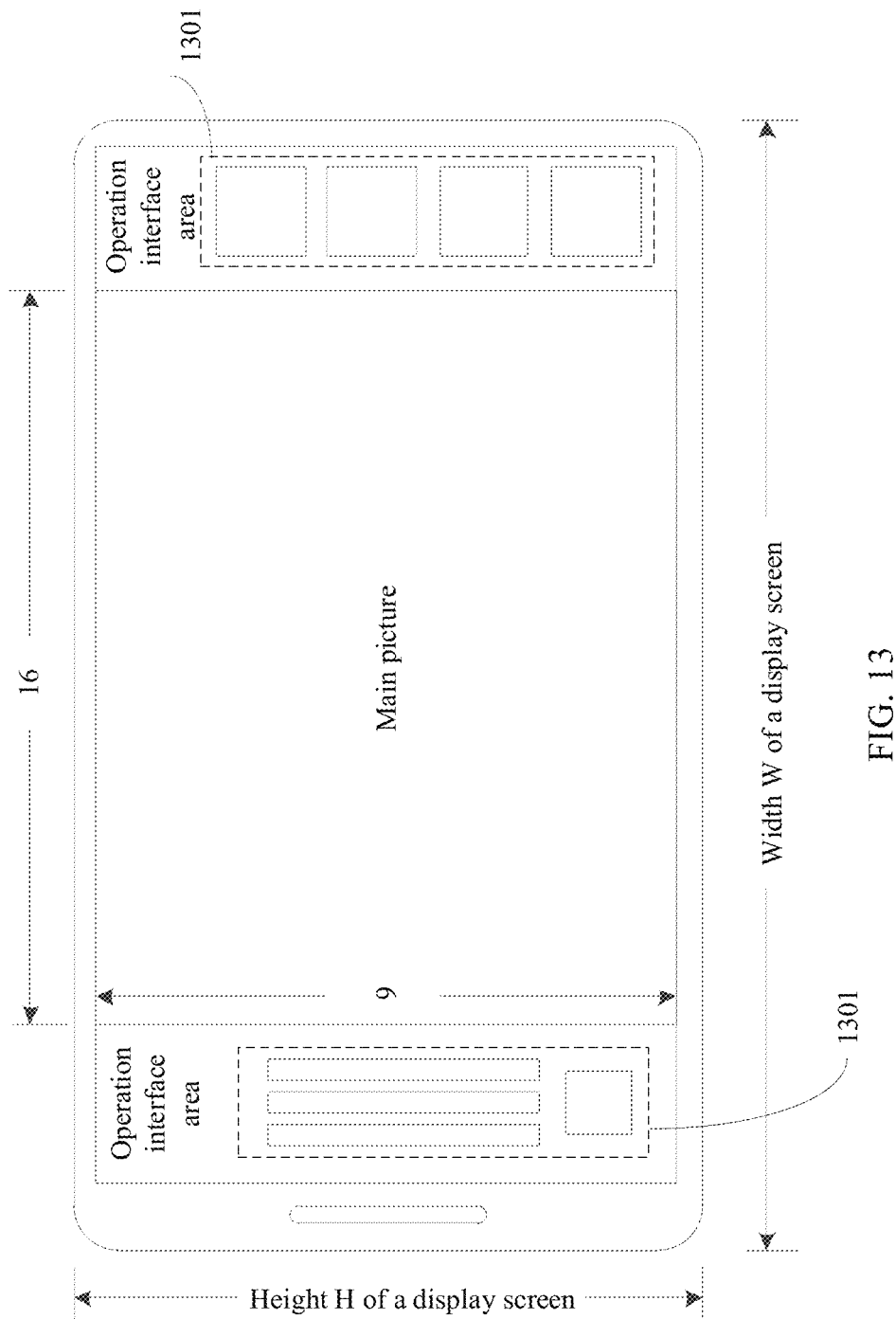
FIG. 13 is another schematic diagram of display of an operation view.

FIG. 13 is another schematic diagram of display of an operation view. As shown in FIG. 13, when the electronic device is rotated, a horizontal-to-vertical ratio of the display screen is W/H, and a horizontal-to-vertical ratio of a main picture is 16/9. The horizontal-to-vertical ratio W/H of the display screen is much larger than the horizontal-to-vertical ratio of the main picture 16/9, that is, a difference between the horizontal-to-vertical ratio W/H of the display screen and the horizontal-to-vertical ratio 16/9 of the main picture is greater than the first preset value; in this case, because when height of the main picture fills the entire screen, the second area may be located on a left side and/or a right side of the display screen, an operation view 1301 may be entirely displayed in an operation interface area on the left side of the display screen, or the operation view 1301 may be entirely displayed in an operation interface area on the right side of the display screen. In addition, the operation view 1301 may alternatively be separately displayed in different second areas. As shown in FIG. 13, the operation view 1301 may be partially displayed in the operation interface area on the left side of the display screen, and partially displayed in the operation interface area on the right side of the display screen. A specific display position of each operation view 1301 is not limited in this embodiment of this application provided that the operation view 1301 and the main picture are separated for display.

It should be noted that if the main picture is displayed in the middle of the display screen, and neither height nor width of the main picture fills the entire screen, there is a second area on each of the upper part, the lower part, the left side, and the right side of the display screen, the operation view may be displayed in at least some of the second areas in the four parts. For example, the operation view may be entirely displayed in the second area on the left side; the operation view is entirely displayed in the second area on the right side; or the operation view is partially displayed in the second area in the upper part, and partially displayed in the second area on the right side.

The first preset value may be set based on experience or an actual situation. For example, the first preset value may be set based on a quantity of operation views. For example, when the quantity of operation views is relatively large, a relatively large second area is required for displaying the operation views, and therefore, the first preset value may be set to be relatively large. When the quantity of operation views is relatively small, a relatively small second area is required for displaying the operation views, and therefore, the first preset value may be set to be relatively small.

In this embodiment, when the difference between the horizontal-to-vertical ratio of the display screen and the horizontal-to-vertical ratio of the area for displaying the main picture is greater than the first preset value, the operation view may be controlled to be displayed in the second area in a fixed and unfolded manner. In this way, not only utilization of the second area can be improved, but a phenomenon that the operation view needs to be first tapped and invoked before an operation can be performed is avoided, so that operations of a user are simplified, and user experience is improved.

Figure 14:
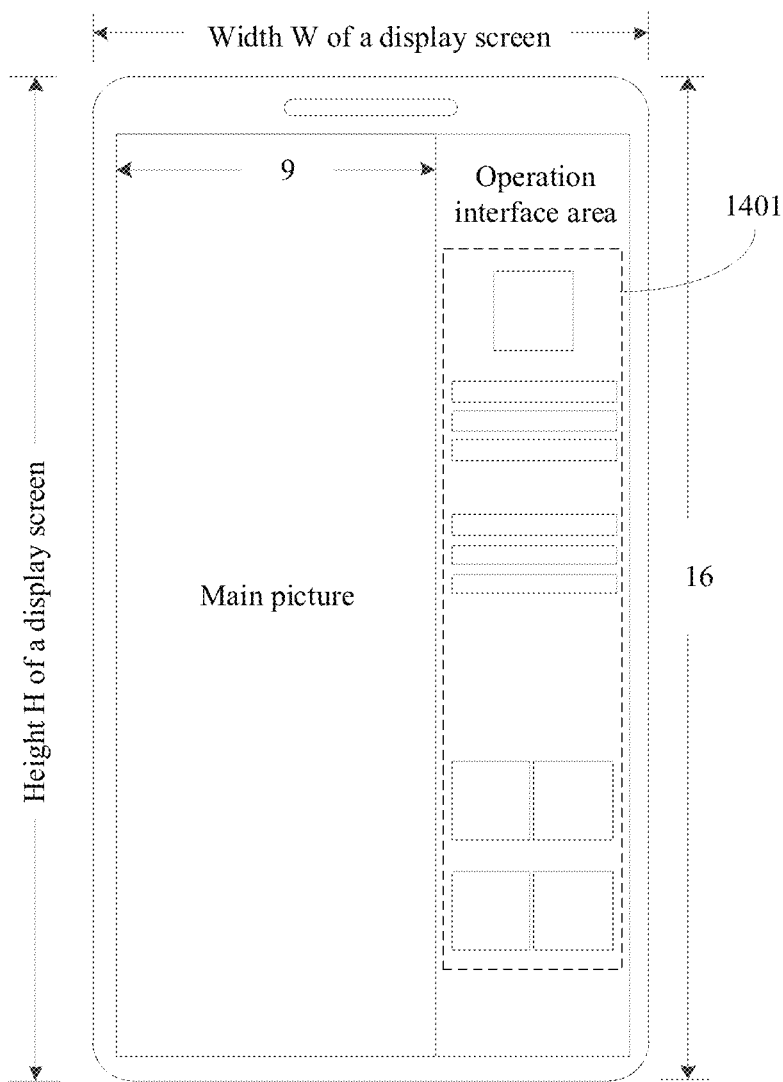
FIG. 14 is still another schematic diagram of display of an operation view.

FIG. 14 is still another schematic diagram of display of an operation view. As shown in FIG. 14, a first area used to play the multimedia information is a main picture; in other words, the second size information of the multimedia information is size information of the main picture. A horizontal-to-vertical ratio of the display screen is W/H, and a horizontal-to-vertical ratio of the main picture is 9/16. Because the horizontal-to-vertical ratio W/H of the display screen is much larger than the horizontal-to-vertical ratio 9/16 of the main picture, that is, a difference between the horizontal-to-vertical ratio W/H of the display screen and the horizontal-to-vertical ratio 9/16 of the main picture is greater than the first preset value, an operation view 1401 may be controlled to be displayed in the second area in a fixed and unfolded manner. For example, the operation view 1401 may be displayed in an operation interface area in a fixed and unfolded manner. The operation view 1401 may be displayed in a same second area in a centralized manner. As shown in FIG. 14, the operation view 1401 may be entirely displayed in an operation interface area on a right side of the display screen. It may be understood that, if the main picture is displayed on the right side of the display screen, the operation view 1401 may be entirely displayed in an operation interface area on a left side of the display screen. In addition, if the main picture is displayed in the middle of the display screen, the operation view 1401 may be partially displayed in the operation interface area on the left side of the display screen, and partially displayed in the operation interface area on the right side of the display screen. A specific display position of each operation view 1401 is not limited in this embodiment of this application provided that the operation view 1401 and the main picture are separated for display.

In this embodiment, when the difference between the horizontal-to-vertical ratio of the display screen and the horizontal-to-vertical ratio of the main picture is greater than the first preset value, the operation view may be controlled to be displayed in the second area in a fixed and unfolded manner. In this way, not only utilization of the second area can be improved, but a phenomenon that the operation view needs to be first tapped and invoked before an operation can be performed is avoided, so that operations of a user are simplified, and user experience is improved.

For example, when a difference between the horizontal-to-vertical ratio of the display screen and a horizontal-to-vertical ratio of the first area is less than the second preset value, it indicates that an area of the second area other than the first area on the display screen is relatively small. In this case, the second area is not enough to accommodate all operation views. Therefore, the operation views may be controlled to be displayed in a folded and shrunk manner when being displayed in the second area.

During display in the folded and shrunk manner may be understood as follows: When receiving a first operation instruction triggered by the user, the electronic device displays all operation views in the second area. The electronic device may hide all the operation views when the electronic device does not receive, after preset time expires, a second operation instruction triggered by the user. For example, alternatively, the electronic device may hide some operation views when the electronic device does not receive, after preset time expires, a second operation instruction triggered by the user. Alternatively, this may be understood as follows: Some operation views are displayed in the second area in a fixed and unfolded manner, and some operation views are displayed in the second area only after the first operation instruction triggered by the user is received.

In addition, if all the operation views are hidden, the second area is filled with white or black.

Figure 15:
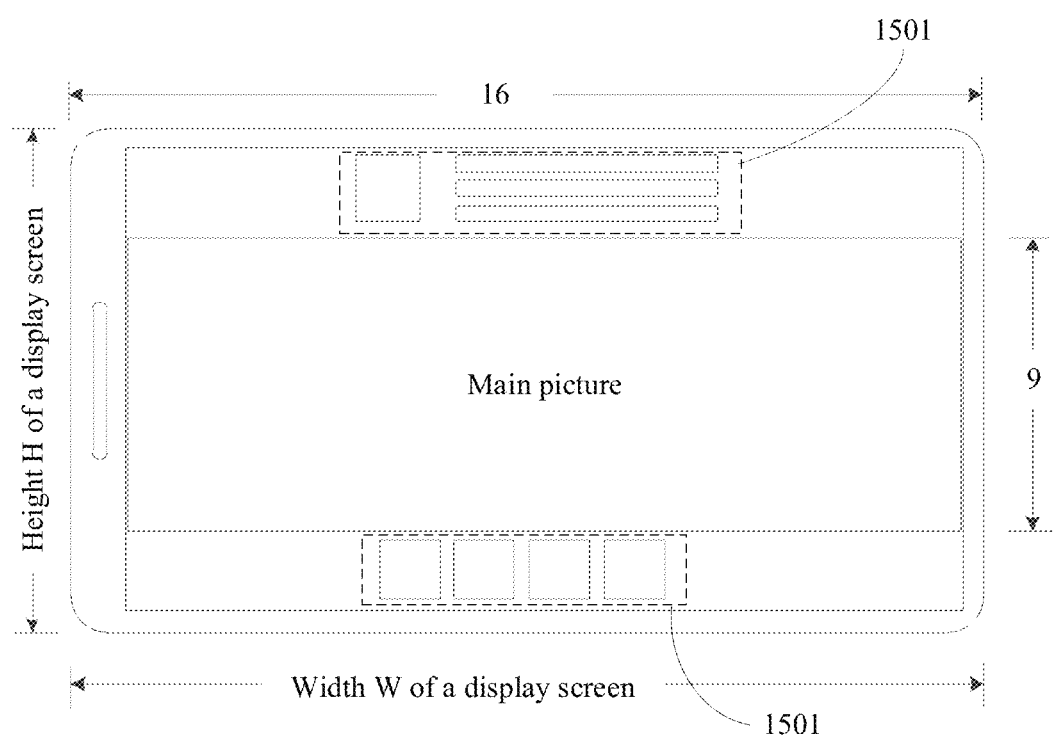
FIG. 15 is still another schematic diagram of display of an operation view.

FIG. 15 is still another schematic diagram of display of an operation view. As shown in FIG. 15, a first area used to play the multimedia information is a main picture; in other words, the second size information of the multimedia information is size information of the main picture. A horizontal-to-vertical ratio of the display screen is W/H, and a horizontal-to-vertical ratio of the main picture is 16/9. Because a difference between the horizontal-to-vertical ratio W/H of the display screen and the horizontal-to-vertical ratio 16/9 of the main picture is less than the second preset value, an area of the second area is relatively small, and all operation views cannot be displayed in a fixed and unfolded manner. Therefore, an operation view 1501 may be displayed in the second area in a folded and shrunk manner. For example, the operation view 1501 may be displayed in an operation interface area in a folded and shrunk manner. When a first operation instruction triggered by the user is not received, all operation views 1501 may be hidden, and when the first operation instruction triggered by the user is received, all the operation views 1501 are displayed in the second area. The electronic device may control to hide all the operation views 1501 when the electronic device does not receive, after a preset time period expires, a second operation instruction triggered by the user. Alternatively, when a first operation instruction triggered by the user is not received, some operation views 1501 may be hidden, and when the first operation instruction triggered by the user is received, the hidden operation views 1501 are displayed in the second area. The electronic device may control to continue to hide the previously hidden operation views 1501 when the electronic device does not receive, after a preset time period expires, a second operation instruction triggered by the user. The hidden operation views 1501 may be views that are determined based on historical operation behavior of the user and whose quantity of operation times is less than a third preset value.

In addition, the first operation instruction and the second operation instruction may be triggered by the user by tapping the display screen, or may be triggered in a voice manner, or may be triggered by pressing a physical button. A specific triggering manner of the first operation instruction and the second operation instruction is not limited in this embodiment of this application.

FIG. 12 to FIG. 15 all show display of the operation view when the display screen is a long screen.

In this embodiment, when the difference between the horizontal-to-vertical ratio of the display screen and the horizontal-to-vertical ratio of the main picture is less than the second preset value, the operation view may be controlled to be displayed in the second area in a folded and shrunk manner. In this way, not only utilization of the second area can be improved, but integrity of a multimedia information picture can also be ensured.

Figure 16A:
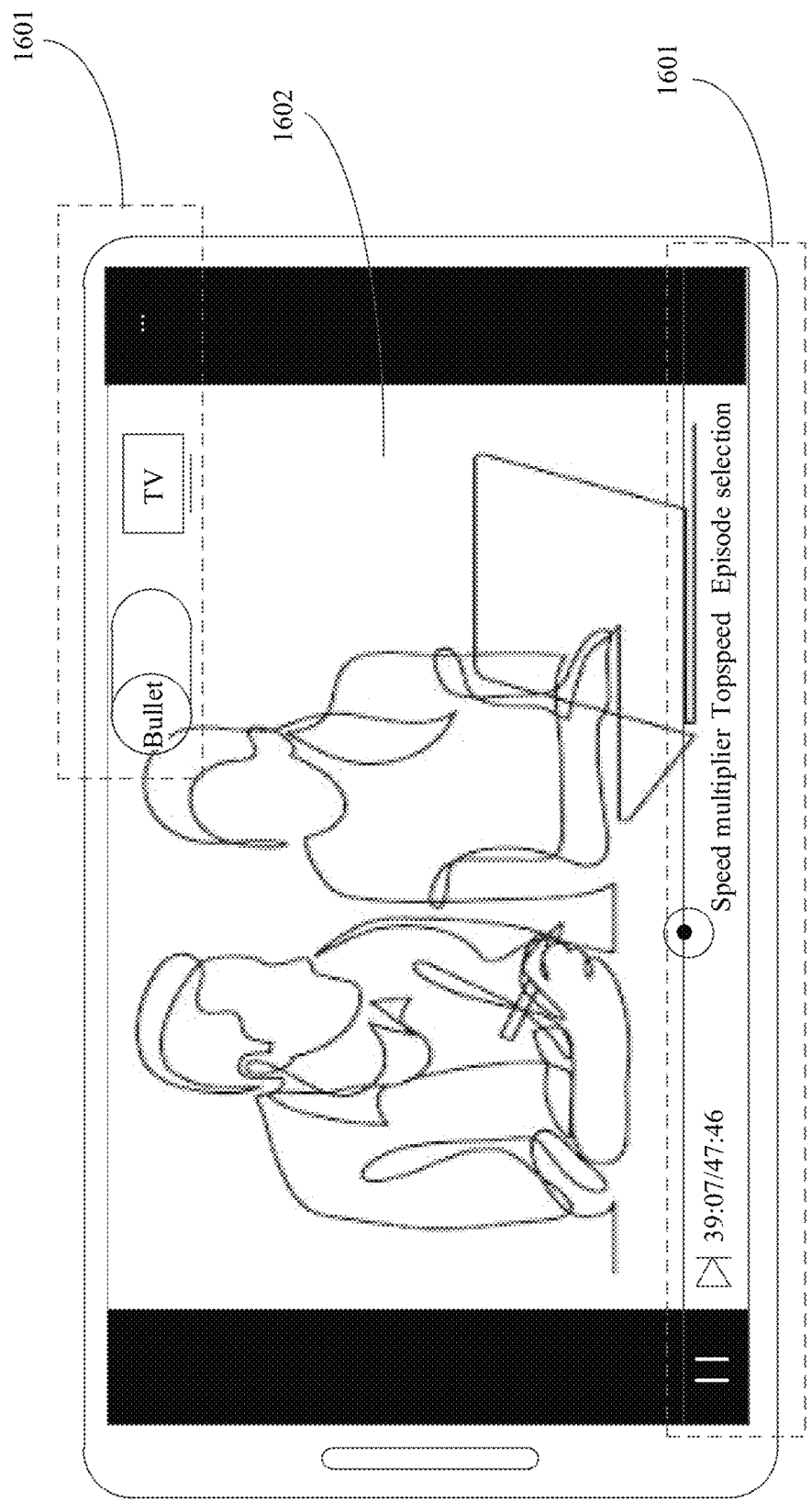
FIG. 16a is a schematic diagram of display of an operation view when an electronic device with a foldable screen is in a folded state.
Figure 16B:
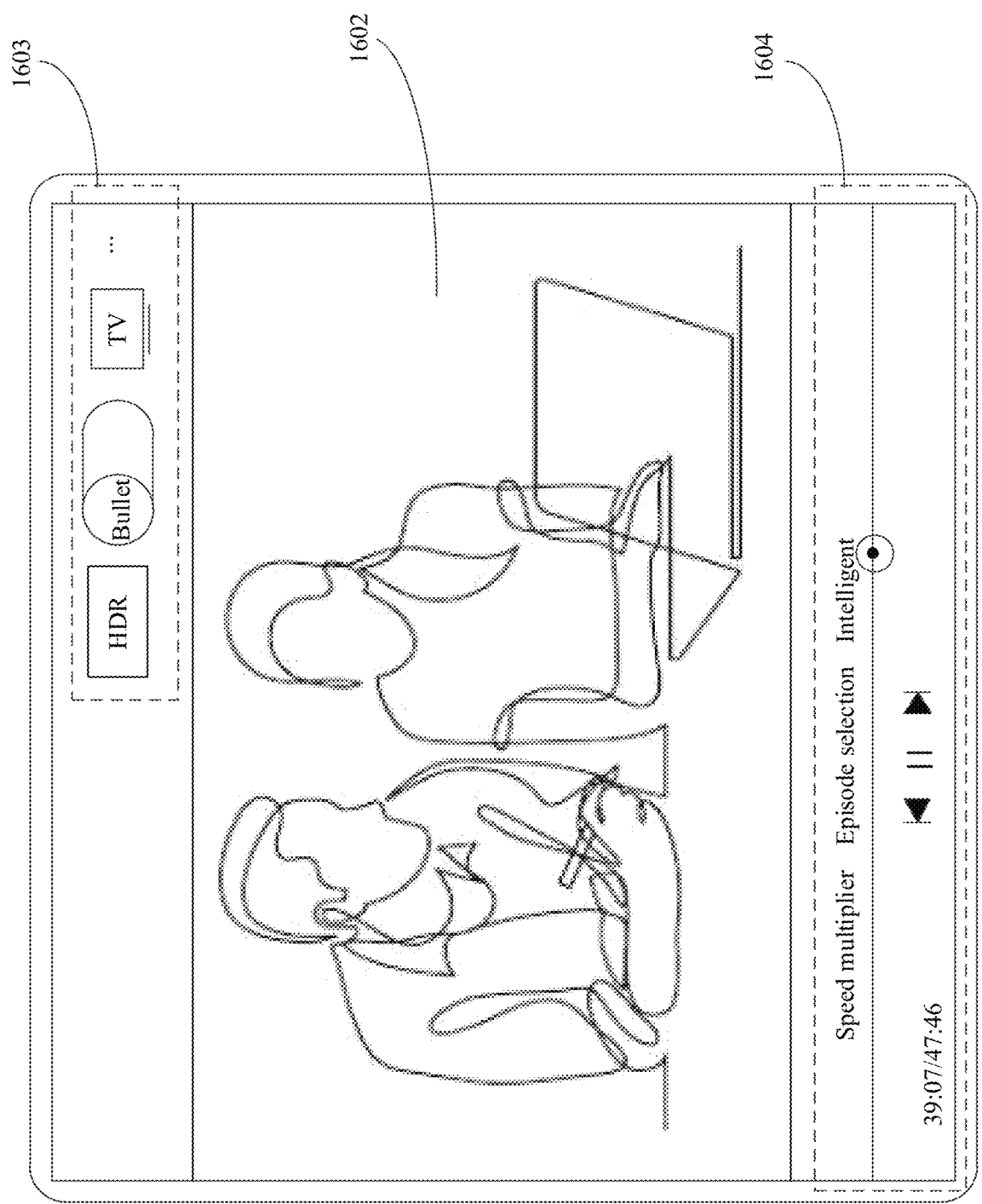
FIG. 16b is a schematic diagram of display of an operation view when an electronic device with a foldable screen is in an unfolded state.

FIG. 16*a* is a schematic diagram of display of an operation view when an electronic device with a foldable screen is in a folded state. FIG. 16*b* is a schematic diagram of display of an operation view when an electronic device with a foldable screen is in an unfolded state. As shown in FIG. 16*a*, when the foldable screen of the electronic device is in the folded state, an operation view 1601 overlaps a display picture 1602 of multimedia information. As shown in FIG. 16*b*, when the foldable screen of the electronic device is in the unfolded state, because the display picture 1602 of the multimedia information is generally in a horizontal-to-vertical ratio of 16:9, that is, second size information of the multimedia information is 16:9, and the foldable screen is approximately a square screen in this case, a minimum value of a horizontal-to-vertical ratio of a display screen is generally 6/8, and a maximum value is 8/6; in other words, first size information of the display screen is generally between 0.75 and 1.33. Therefore, a difference between the second size information of the multimedia information and the first size information of the display screen is greater than a first preset value. In this case, the electronic device displays the operation view in a second area in the fixed and unfolded manner shown in FIG. 12 and FIG. 15, so that the operation view and the multimedia information are separated for display. Specifically, when the display screen is in the unfolded state, the multimedia information is generally displayed in the middle of the display screen. When width of the display picture 1602 of the multimedia information fills the display screen, that is, when the display picture 1602 of the multimedia information fills the display screen in a horizontal direction, there is a second area filled with other color (such as black) in an upper part and a lower part of the display screen. In this case, an operation view 1604 may be displayed in the second area below the display picture 1602 of the multimedia information, and an operation view 1603 is displayed in the second area above the display picture 1602 of the multimedia information; in other words, the operation view 1603 and the operation view 1604 are separated from the display picture 1602 of the multimedia information. Certainly, both the operation view 1603 and the operation view 1604 may be displayed in the second area below the display picture 1602 of the multimedia information, or both the operation view 1603 and the operation view 1604 are displayed in the second area above the display picture 1602 of the multimedia information.

In this embodiment, on the square screen, an operation view may be displayed in a non-picture area above and/or below a display picture of multimedia information. In this way, the operation view does not cover the display picture of the multimedia information, so that a display effect of the multimedia information can be improved. In addition, because the operation view is displayed in a fixed and unfolded manner, the user does not need to first tap the display screen to invoke the operation view, but may directly perform an operation on the operation view, so that operations of the user can be simplified, and user experience can be improved. Further, because the operation view is displayed in a second area other than the display picture of the multimedia information, not only utilization of the second area can be improved, but space of the display screen can also be fully used.

Figure 17A:
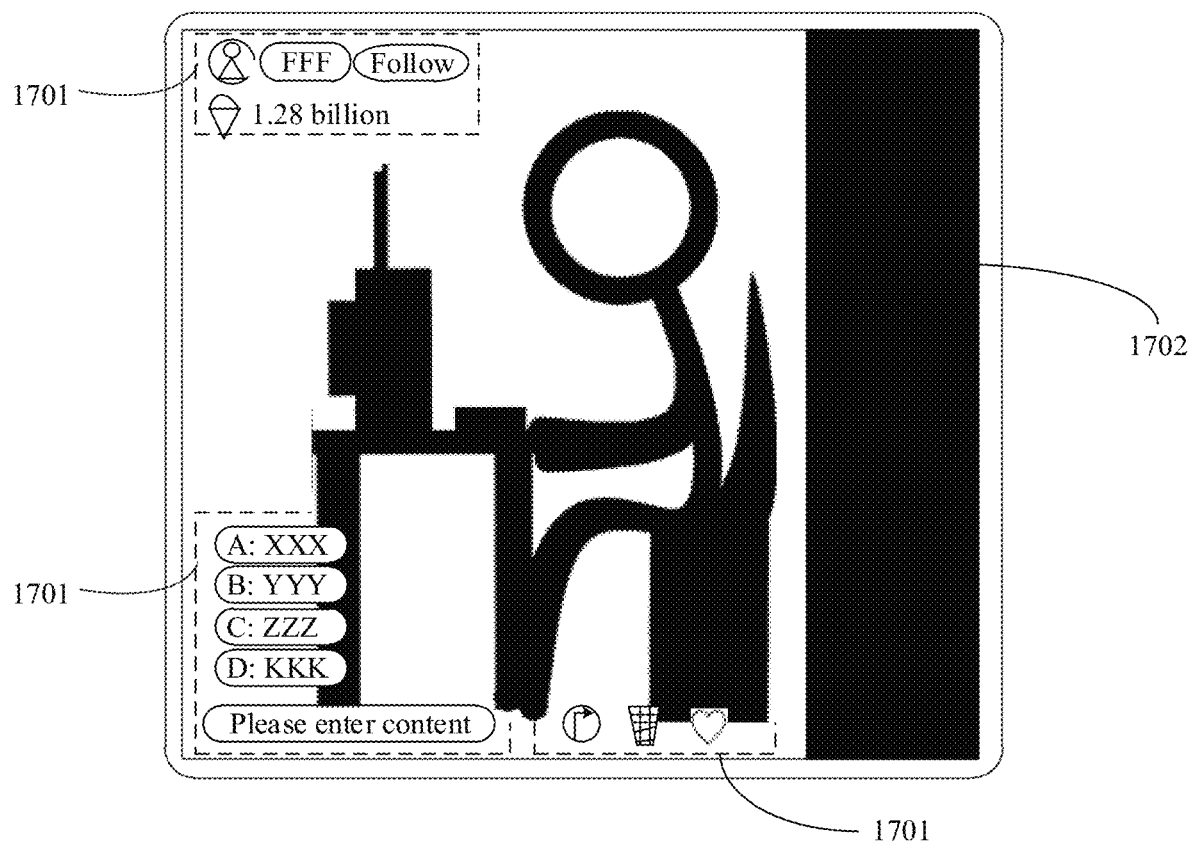
FIG. 17a is a schematic diagram of display of an operation view when an electronic device with a foldable screen is in an unfolded state in a conventional technology.

FIG. 17a is a schematic diagram of display of an operation view when an electronic device with a foldable screen is in an unfolded state in a conventional technology. As shown in FIG. 17a, when the foldable screen is in the unfolded state, the foldable screen is generally a square screen. Currently, ratios of pictures of many short videos or live streaming videos do not match a size of the foldable screen in the unfolded state. In this case, there is an area filled with other color (such as black) in at least one area in an upper part, a lower part, a left side, or a right side of the electronic device, for example, an area 1702 filled with black on the right side in FIG. 17a. In addition, live streaming is used as an example. Currently, a user interface (user interface, UI) element or an operation view 1701 such as an input box in a comment area, a textbox, a small animation icon, or an online streamer information area is superposed on a video live streaming picture. In this way, not only an area filled with other color (such as black) is wasted, but a display effect of the video picture is also poor.

To resolve the foregoing problem, when an activity component Activity of a live streaming interface is started, a view tree ViewTree is analyzed, UI elements are traversed to find a video live streaming view Surface View, the video live streaming view SurfaceView is used as a reference to find another UI element, and the UI elements are classified into two groups: a video interface group and an operation view group. The two groups of interfaces and views are re-placed based on a feature of a screen size and a predefined rule.

Figure 17B:
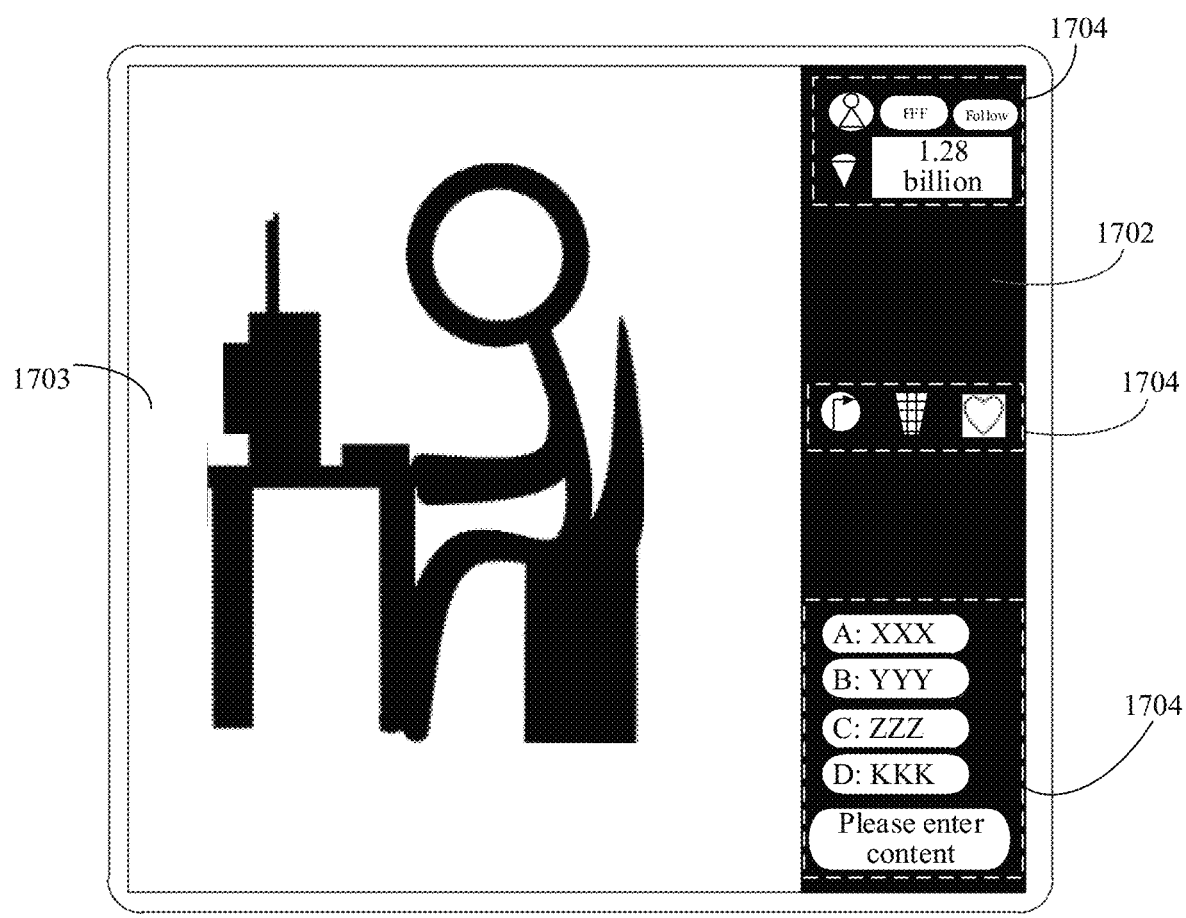
FIG. 17b is a schematic diagram of display of an operation view when an electronic device with a foldable screen is in an unfolded state according to an embodiment of this application.

FIG. 17b is a schematic diagram of display of an operation view when an electronic device with a foldable screen is in an unfolded state according to an embodiment of this application. As shown in FIG. 17b, because a difference between second size information of multimedia information and first size information of a display screen is greater than the first preset value, the electronic device displays the operation view in a second area in a fixed and unfolded manner, to separate the operation view and the multimedia information for display. Specifically, when the display screen is in the unfolded state, because a video picture 1703 is displayed on a left side of the display screen, and after the video picture 1703 is displayed based on the first size information of the display screen of the electronic device, a second area 1702 filled with black appears on a right side of the display screen. In this case, the electronic device may display an operation view 1704 in the second area 1702 on the right side of the display screen in the manner shown in FIG. 14. Certainly, a user may also set a display position of each operation view based on a preference of the user or an actual requirement. A specific display position of each operation view is not limited in this embodiment of this application provided that each operation view 1704 is not superposed on the video picture 1703.

Figure 17C:
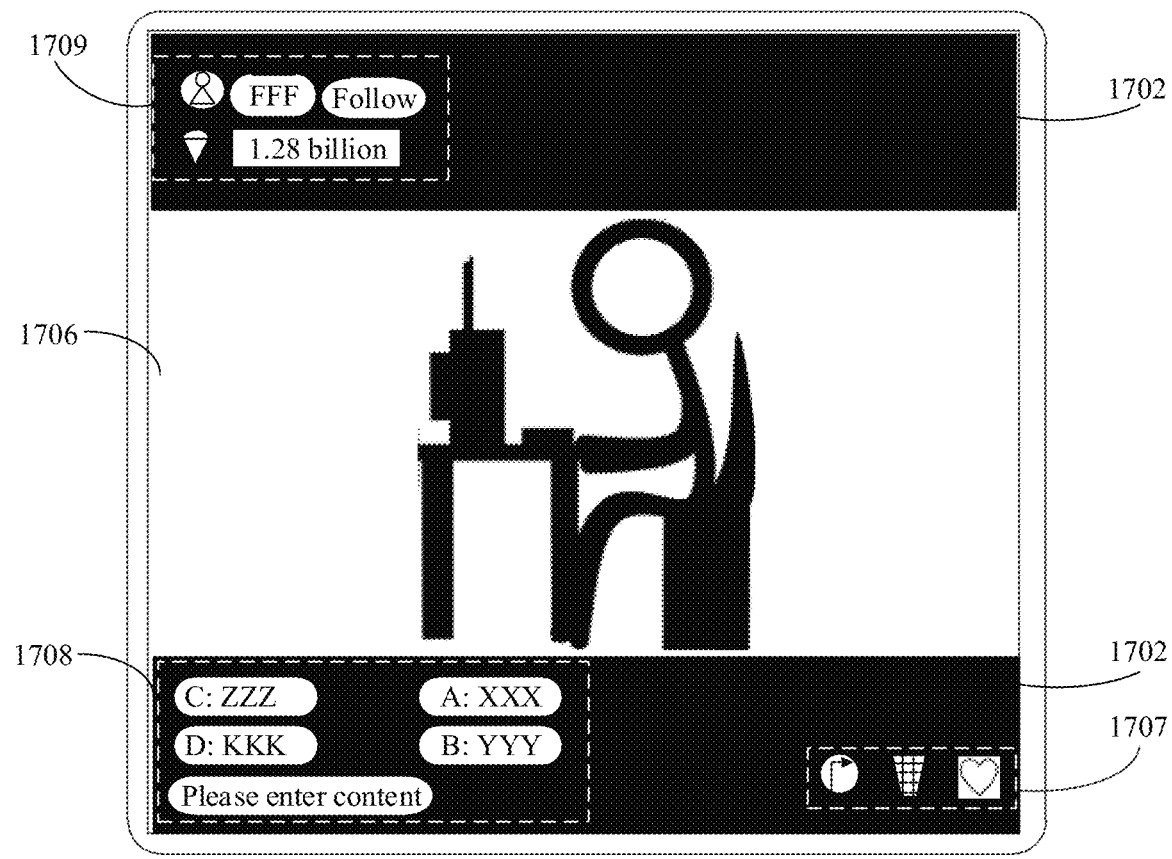
FIG. 17c is another schematic diagram of display of an operation view when an electronic device with a foldable screen is in an unfolded state according to an embodiment of this application.

FIG. 17c is another schematic diagram of display of an operation view when an electronic device with a foldable screen is in an unfolded state according to an embodiment of this application. As shown in FIG. 17c, because a video picture 1706 is displayed at a middle position of a display screen, and after the video picture 1706 is displayed based on first size information of the display screen of the electronic device, a second area 1702 filled with black appears in both an upper part and a lower part of the display screen. In this case, the electronic device may display an operation view 1709 in the second area 1702 in the upper part of the display screen in the manner of FIG. 12 or FIG. 15, and display an operation view 1707 and an operation view 1708 in the second area 1702 in the lower part of the display screen. Alternatively, the operation view 1707 and the operation view 1709 may be displayed in the second area 1702 in the upper part of the display screen, and the operation view 1708 is displayed in the second area 1702 in the lower part of the display screen. Certainly, a user may also set a display position of each operation view based on a preference of the user or an actual requirement. A specific display position of each operation view is not limited in this embodiment of this application provided that each operation view is not superposed on the video picture 1706.

In this embodiment, the foregoing display manner can ensure integrity of the video picture. In addition, because the operation view is displayed in the second area outside the video picture, utilization of the second area can be improved, and a view on the display screen can be fully used. In addition, the operation view does not need to be stacked on the video picture, so that not only the user can get more immersed viewing experience, and viewing experience of the user is improved, but operational interaction such as making comments can also be made clearer.

In conclusion, display positions of the multimedia information and the operation view on the display screen differ as the first size information of the display screen is different. Table 1 shows display manners of the multimedia information and the operation view based on different first size information when the second size information of the multimedia information is 16:9, in other words, a horizontal-to-vertical ratio of the multimedia information is 16:9.

TABLE 1

| Horizontal-to-vertical ratio (ratio) of a display screen | Display positions of multimedia information (a main picture) and an operation view | Display manner of the operation view |
|---|---|---|
| ratio ≤ 9:16 | Rotate the screen to display the multimedia information (the main picture) | / |
| 9:16 < ratio < 3:4 | The multimedia information (the main picture) is displayed in the middle, and the operation view is displayed below the multimedia information (the main picture), or the operation view is displayed above and below the multimedia information (the main picture) | Fixed and unfolded display |
| 3:4 < ratio < 4:3 | The multimedia information (the main picture) is displayed in the middle, and the operation view is displayed below the multimedia information (the main picture), or the operation view is displayed above and below the multimedia information (the main picture) | Fixed and unfolded display |
| 4:3 < ratio < 16:9 | The multimedia information (the main picture) is displayed in the middle, and if an operation instruction is received, the operation view is displayed above and below the multimedia information (the main picture) | Display in a folded and shrunk manner |
| 16:9 ≤ ratio ≤ 21:9 | The multimedia information (the main picture) is displayed in the middle, and if an operation instruction is received, the operation view is displayed above and below the multimedia information (the main picture) | Display in a folded and shrunk manner |
| 21:9 ≤ ratio ≤ 25:9 | The multimedia information (the main picture) is displayed in the middle, and the operation view is displayed below the multimedia information (the main picture), or the operation view is displayed above and below the multimedia information (the main picture) | Fixed and unfolded display |

It should be noted that the horizontal-to-vertical ratio (ratio) of the display screen in Table 1, the multimedia information (the main picture), the display position of the operation view, and the display manner of the operation view are all examples. In actual application, the horizontal-to-vertical ratio of the display screen may alternatively be another ratio, and the display positions of the multimedia information (the main picture) and the operation view and the display manner of the operation view may alternatively have another display form provided that when an area of the second area other than the first area in which the multimedia information is displayed is greater than a preset value, the multimedia information (the main picture) and the operation view are separated for display and do not overlap.

It may be understood that, in the foregoing embodiments, a specific display position of each operation view may alternatively be set by the user, for example, a position of a specific operation view is changed by tapping or dragging the operation view.

In the foregoing display manner, space of the display screen can be fully used, so that utilization of the display screen can be improved, and integrity of display of the multimedia information can be ensured.

According to the display control method provided in this embodiment of this application, the first size information of the screen of the electronic device and the second size information of the multimedia information are separately obtained, and then the first area that is on the screen and in which the multimedia information is displayed is determined based on the first size information and the second size information, and the operation view is displayed in the second area other than the first area on the screen. The multimedia information is displayed in the first area, and the operation view is displayed in the second area other than the first area; in other words, the multimedia information and the operation view are separated for display. Therefore, utilization of the second area can be improved. In addition, because all areas on the screen are used, utilization of the screen can be improved. Further, because the multimedia information and the operation view are separated for display, a phenomenon in a conventional technology that the operation view is superposed on the multimedia information for display is avoided, and therefore, a display effect of a picture can be effectively improved.

Figure 18:
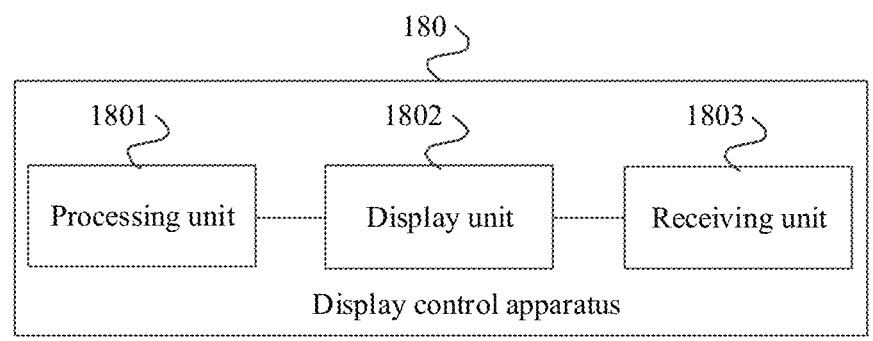
FIG. 18 is a schematic diagram of a structure of a display control apparatus 180 according to an embodiment of this application.

FIG. 18 is a schematic diagram of a structure of a display control apparatus 180 according to an embodiment of this application. For example, as shown in FIG. 18, the display control apparatus 180 may include:

a processing unit 1801, configured to separately obtain first size information of a display screen of an electronic device, second size information of to-be-played multimedia information, and an operation view used to control the multimedia information, where the processing unit 1801 is further configured to determine, based on the first size information and the second size information, a first area that is on the display screen and in which the multimedia information is displayed; and a display unit 1802, configured to display the operation view in a second area other than the first area on the display screen.

Optionally, the display unit 1802 is specifically configured to: determine a display manner of the operation view based on the first size information and the second size information, where the display manner includes fixed and unfolded display or folded and shrunk display; and display the operation view in the second area in the display manner.

Optionally, the processing unit 1801 is specifically configured to: determine a difference between the first size information and the second size information; and if the difference is greater than a first preset value, determine that the display manner of the operation view is fixed and unfolded display.

Optionally, the processing unit 1801 is further configured to: if the difference is less than a second preset value, determine that the display manner of the operation view is folded and shrunk display.

Optionally, the display manner is folded and shrunk display; and the display unit 1802 is specifically configured to: if a second operation instruction triggered by a user is not received within a preset time period, display some operation views in the second area, and hide other operation views.

Optionally, the apparatus further includes a receiving unit 1803, and the receiving unit 1803 is configured to receive a first operation instruction triggered by the user; and the display unit 1802 is further configured to display all operation views in the second area after the receiving unit receives the first operation instruction triggered by the user.

Optionally, the other operation views include a view whose quantity of use times is less than a third preset value.

Optionally, the receiving unit 1803 is further configured to receive a third operation instruction triggered by the user, and the third operation instruction includes identification information of an application. The processing unit 1801 is further configured to: determine, based on the identification information of the application, a video view that is in the application and that is used to render the multimedia information, and determine the second size information based on the video view.

Optionally, the processing unit 1801 is specifically configured to: determine an application used to play the multimedia information; separately determine whether views of the application include a surface view and an interactive view; if the views of the application include the surface view and the interactive view, determine a first common parent layout node of the surface view and the interactive view; and display the operation view in the second area based on the first common parent layout node.

Optionally, the processing unit 1801 is specifically configured to: determine whether the first common parent layout node is FrameLayout; if the first common parent layout node is FrameLayout, set the first common parent layout node of the surface view and the interactive view to a LinearLayout view; and display the operation view in the second area based on the LinearLayout view.

The display control apparatus 180 shown in this embodiment of this application may perform the display control method shown in any one of the foregoing embodiments. An implementation principle and beneficial effects of the display control apparatus 180 are similar to an implementation principle and beneficial effects of the display control method, and are not described herein again.

It should be noted that the foregoing unit division of the apparatus is merely logical function division. In actual implementation, all or some of the units may be integrated into a same physical entity, or may be physically separated. In addition, all these units may be implemented in a form of software by invoking a processing element; or all these units may be implemented in a form of hardware; or some units may be implemented in a form of software by invoking a processing element, and some units are implemented in a form of hardware. For example, the receiving unit may be a separately disposed processing element, or may be integrated into a chip of the display control apparatus for implementation, or may be stored in a memory of the display control apparatus in a form of a program, and a processing element of the display control apparatus invokes and performs a function of the receiving unit. An implementation of other units is similar to this. In addition, all or some of these units may be integrated together, or may be implemented independently. The processing element may be an integrated circuit chip and has a signal processing capability. In an implementation process, steps in the foregoing methods or the foregoing units can be implemented by using a hardware integrated logical circuit in the processing element, or by using instructions in a form of software. In addition, the foregoing receiving unit is a receiving control unit, and may receive information by using a receiving apparatus such as an antenna or a radio frequency apparatus of the display control apparatus.

The foregoing units may be one or more integrated circuits configured to implement the foregoing method, for example, one or more application-specific integrated circuits (application-specific integrated circuit, ASIC), one or more microprocessors (digital signal processor, DSP), or one or more field programmable gate arrays (field programmable gate array, FPGA). For another example, when a specific unit is implemented in a form of a processing element by invoking a program, the processing element may be a general purpose processor, such as a central processing unit (central processing unit, CPU) or another processor that can invoke a program. For another example, the units may be integrated together and implemented in a form of a system-on-a-chip (system-on-a-chip, SOC).

Figure 19:
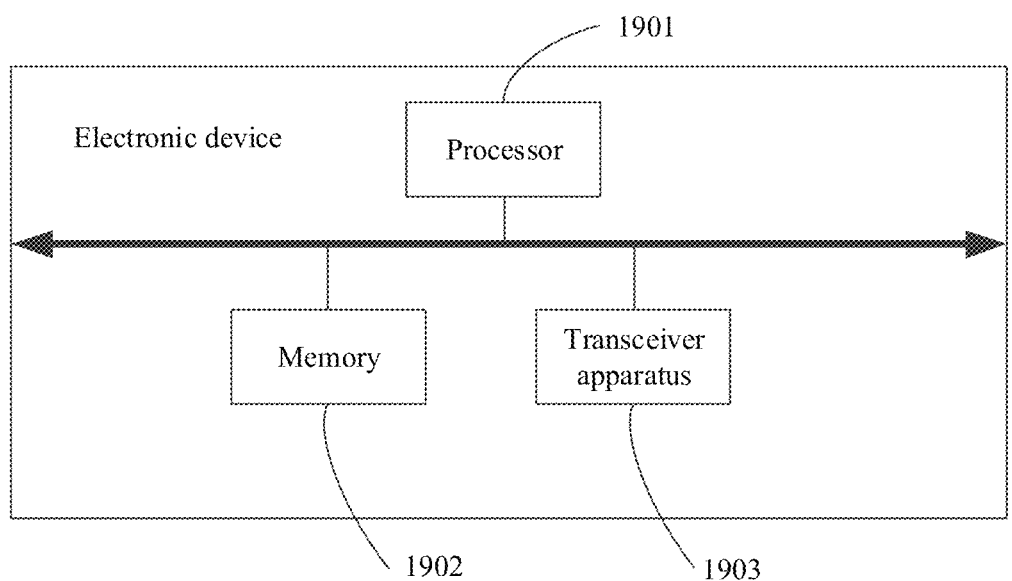
FIG. 19 is a schematic diagram of a structure of an electronic device according to an embodiment of this application.

FIG. 19 is a schematic diagram of a structure of an electronic device according to an embodiment of this application. As shown in FIG. 19, the electronic device includes a processor 1901, a memory 1902, and a transceiver apparatus 1903. The transceiver apparatus 1903 may be connected to an antenna. In a downlink direction, the transceiver apparatus 1903 receives, by using the antenna, information sent by a base station, and sends the information to the processor 1901 for processing. In an uplink direction, the processor 1901 processes data of a terminal, and sends the data to the base station by using the transceiver apparatus 1903.

The memory 1902 is configured to store a program for implementing the foregoing method embodiments or the units in the embodiment shown in FIG. 18. The processor 1901 invokes the program to perform the operations in the foregoing method embodiments, to implement the units shown in FIG. 18.

Alternatively, some or all of the foregoing units may be implemented in a form of an integrated circuit embedded in a chip of the electronic device. In addition, the units may be implemented separately or integrated together. In other words, the foregoing units may be configured as one or more integrated circuits configured to implement the foregoing method, for example, one or more application-specific integrated circuits (application-specific integrated circuit, ASIC), one or more microprocessors (digital signal processor, DSP), or one or more field programmable gate arrays (field programmable gate array, FPGA).

An embodiment of this application further provides a chip. The chip includes a programmable logic circuit and an input interface, the input interface is configured to obtain to-be-processed data, and the logic circuit is configured to perform the display control method shown in any one of the foregoing embodiments for the to-be-processed data. An implementation principle and beneficial effects of the chip are similar to an implementation principle and beneficial effects of the display control method, and are not described herein again.

An embodiment of this application further provides a computer-readable storage medium. The computer-readable storage medium stores instructions, and when the instructions are run on an electronic device, the electronic device is enabled to perform the display control method shown in any one of the foregoing embodiments. An implementation principle and beneficial effects of the computer-readable storage medium are similar to an implementation principle and beneficial effects of the display control method, and are not described herein again.

An embodiment of this application further provides a computer program product. When the computer program product is run on an electronic device, the electronic device is enabled to perform the display control method shown in any one of the foregoing embodiments. An implementation principle and beneficial effects of the computer program product are similar to an implementation principle and beneficial effects of the display control method, and are not described herein again.

The processor in the foregoing various embodiments may be a general purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware in the decoding processor and a software module. A software module may be located in a mature storage medium in the art, such as a random access memory (random access memory, RAM), a flash memory, a read-only memory (read-only memory, ROM), a programmable read-only memory, an electrically erasable programmable memory, a register, or the like. The storage medium is located in the memory, and a processor reads instructions in the memory and completes the steps in the foregoing methods in combination with hardware of the processor.

In the several embodiments provided in this application, it should be understood that the disclosed apparatuses and methods may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of hardware in addition to a software functional unit.

What is claimed is:

1. A display control method, comprising:
separately obtaining first size information of a display screen of an electronic device, second size information of to-be-played multimedia content, and an operation view used to control the multimedia content;
determining, based on the first size information and the second size information, a first area that is on the display screen and in which the multimedia content is displayed; and
displaying the operation view in a second area other than the first area on the display screen, the displaying comprising:
determining a display manner of the operation view based on the first size information and the second size information, wherein the display manner comprises a fixed and unfolded display manner or a folded and shrunk display manner; and
displaying the operation view in the second area in the display manner.

2. The method according to claim 1, wherein the determining the display manner of the operation view based on the first size information and the second size information comprises:
determining a difference between the first size information and the second size information; and
when the difference is greater than a first preset value, determining that the display manner of the operation view is the fixed and unfolded display manner.

3. The method according to claim 2, wherein the method further comprises:
when the difference is less than a second preset value, determining that the display manner of the operation view is the folded and shrunk display manner.

4. The method according to claim 1, wherein the display manner is the folded and shrunk display manner; and
the displaying the operation view in the second area in the display manner comprises:
when a second operation instruction triggered by a user is not received within a preset time period, displaying some operation views in the second area, and hiding other operation views.

5. The method according to claim 4, wherein the method further comprises:
displaying all operation views in the second area after a first operation instruction triggered by the user is received.

6. The method according to claim 4, wherein the other operation views comprise a view whose quantity of use times is less than a third preset value.

7. The method according to claim 1, wherein the obtaining second size information of to-be-played multimedia content comprises:
receiving a third operation instruction triggered by the user, wherein the third operation instruction comprises identification information of an application;
determining, based on the identification information of the application, a video view that is in the application and that is used to render the multimedia content; and
determining the second size information based on the video view.

8. The method according to claim 1, wherein the displaying the operation view in the second area other than the first area on the screen comprises:
determining an application used to play the multimedia content;
separately determining whether views of the application comprise a surface view and an interactive view;
when the views of the application comprise the surface view and the interactive view, determining a first common parent layout node of the surface view and the interactive view; and
displaying the operation view in the second area based on the first common parent layout node.

9. The method according to claim 8, wherein the displaying the operation view in the second area based on the first common parent layout node comprises:
determining whether the first common parent layout node is FrameLayout;
when the first common parent layout node is FrameLayout, setting the first common parent layout node of the surface view and the interactive view to a LinearLayout view; and displaying the operation view in the second area based on the LinearLayout view.

10. An electronic device, wherein the electronic device comprises a processor, a memory, and a display, a display screen of the display comprises a first area and a second area that do not overlap, the display is configured to display content according to an instruction of the processor, the memory stores a computer program, and the processor executes the computer program stored in the memory, so that the electronic device performs the following operations:

separately obtaining first size information of the display screen of the electronic device, second size information of to-be-played multimedia content, and an operation view used to control the multimedia content;

determining, based on the first size information and the second size information, the first area that is on the display screen and in which the multimedia content is displayed; and displaying the operation view in the second area other than the first area on the display screen, the displaying comprising:

determining a display manner of the operation view based on the first size information and the second size information, wherein the display manner comprises a fixed and unfolded display manner or a folded and shrunk display manner; and displaying the operation view in the second area in the display manner.

11. The electronic device according to claim 10, wherein the processor is further configured to:

determine a difference between the first size information and the second size information; and when the difference is greater than a first preset value, determine that the display manner of the operation view is the fixed and unfolded display manner.

12. The electronic device according to claim 11, wherein the processor is further configured to:

when the difference is less than a second preset value, determine that the display manner of the operation view is the folded and shrunk display manner.

13. The electronic device according to claim 10, wherein the display manner is the folded and shrunk display manner; and the processor is further configured to: when a second operation instruction triggered by a user is not received within a preset time period, display some operation views in the second area, and hide other operation views.

14. The electronic device according to claim 13, wherein the processor is further configured to display all operation views in the second area after a first operation instruction triggered by the user is received.

15. The electronic device according to claim 13, wherein the other operation views comprise a view whose quantity of use times is less than a third preset value.

16. The electronic device according to claim 10, wherein the processor is further configured to:

receive a third operation instruction triggered by the user, wherein the third operation instruction comprises identification information of an application;

determine, based on the identification information of the application, a video view that is in the application and that is used to render the multimedia content; and determine the second size information based on the video view.

17. The electronic device according to claim 10, wherein the processor is further configured to:

determine an application used to play the multimedia content;

separately determine whether views of the application comprise a surface view and an interactive view;

when the views of the application comprise the surface view and the interactive view, determine a first common parent layout node of the surface view and the interactive view; and display the operation view in the second area based on the first common parent layout node.

18. A non-transitory computer-readable storage medium, wherein the non-transitory computer-readable storage medium stores instructions, and when the instructions are run on an electronic device, the electronic device is configured to perform:

separately obtaining first size information of a display screen of the electronic device, second size information of to-be-played multimedia content, and an operation view used to control the multimedia content;

determining, based on the first size information and the second size information, the first area that is on the display screen and in which the multimedia content is displayed; and displaying the operation view in a second area on the display screen other than the first area on the display screen, the displaying comprising:

determining a display manner of the operation view based on the first size information and the second size information, wherein the display manner comprises a fixed and unfolded display manner or a folded and shrunk display manner; and displaying the operation view in the second area in the display manner.

* * * * *